United States Patent [19]

Aoki et al.

[11] Patent Number: 5,602,823
[45] Date of Patent: Feb. 11, 1997

[54] OPTICAL RECORDING MEDIUM HAVING PRE-FORMATTED PATTERNS ARRANGE BY SHIFTING PHASES

[75] Inventors: Ikuo Aoki; Yoshitaka Takahashi; Hiroshi Maegawa, all of Yokohama, Japan

[73] Assignee: Ricoh Company, Ltd., Tokyo, Japan

[21] Appl. No.: 281,472

[22] Filed: Jul. 27, 1994

[30] Foreign Application Priority Data

Jul. 30, 1993 [JP] Japan ................................ 5-189761
Jul. 30, 1993 [JP] Japan ................................ 5-189762

[51] Int. Cl.⁶ .................................................. G11B 7/24
[52] U.S. Cl. ................................ 369/275.3; 369/275.4
[58] Field of Search ........................ 369/275.3, 275.2, 369/275.4, 13, 47, 48, 54, 58; 300/59, 114; 428/694 ML

[56] References Cited

U.S. PATENT DOCUMENTS

| | | | |
|---|---|---|---|
| 5,353,277 | 10/1994 | Yasuda et al. | 369/275.4 |
| 5,452,272 | 9/1995 | Murakami et al. | 369/13 |
| 5,452,284 | 9/1995 | Miyagawa et al. | 369/275.3 |
| 5,508,995 | 4/1996 | Moriya et al. | 369/275.3 |

OTHER PUBLICATIONS

K. Kayanuma et al., "High Track Density Magneto–Optical Recording Using a Crosstalk Canceler", Proceedings of Optical Data Storage '90, pp. 18–21, 1990.

Primary Examiner—Tan Dinh
Attorney, Agent, or Firm—Cooper & Dunham LLP

[57] ABSTRACT

Optical information recording medium in which, information of a data format constructed by an ID section and a data section can be recorded and regenerated from both regions of a land portion and a groove portion formed on a disk face. Information such as an address is recorded to the ID section as a format by a PPM recording system when information is recorded to the data section by a PWM recording system. The information recording medium may have a land portion and a groove portion formed in a spiral or concentric shape. A land mark may be formed in a position information section of the land portion and constructed by a pit recorded as position information, and a groove mark may be formed in a position information section of the groove portion. The groove mark may be constructed using an interrupting portion between grooves and recorded as independent position information different from the position information of the land portion.

2 Claims, 25 Drawing Sheets

Fig. 8a

| GROOVE | 0 | 0 | 1 | 0 | 0 | 1 | 0 | ~3 |
|---|---|---|---|---|---|---|---|---|
| LAND | | 1 | 0 | 0 | 1 | 0 | 0 | ~2 |
| GROOVE | 0 | 0 | 1 | 0 | 0 | 1 | 0 | ~3 |

Fig. 8b

| GROOVE | 1 | 0 | 1 | 0 | 1 | 0 | ~3 |
|---|---|---|---|---|---|---|---|
| LAND | 0 | 1 | 0 | 1 | 0 | 1 | ~2 |
| GROOVE | 1 | 0 | 1 | 0 | 1 | 0 | ~3 |

Fig. 10a PRIOR ART
(DATA SECTION)
(ID SECTION)
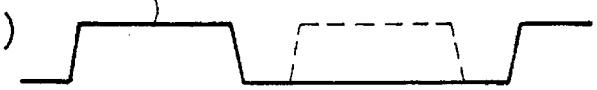
Fig. 10b PRIOR ART
(DATA SECTION) 
(ID SECTION) 

(A<B)

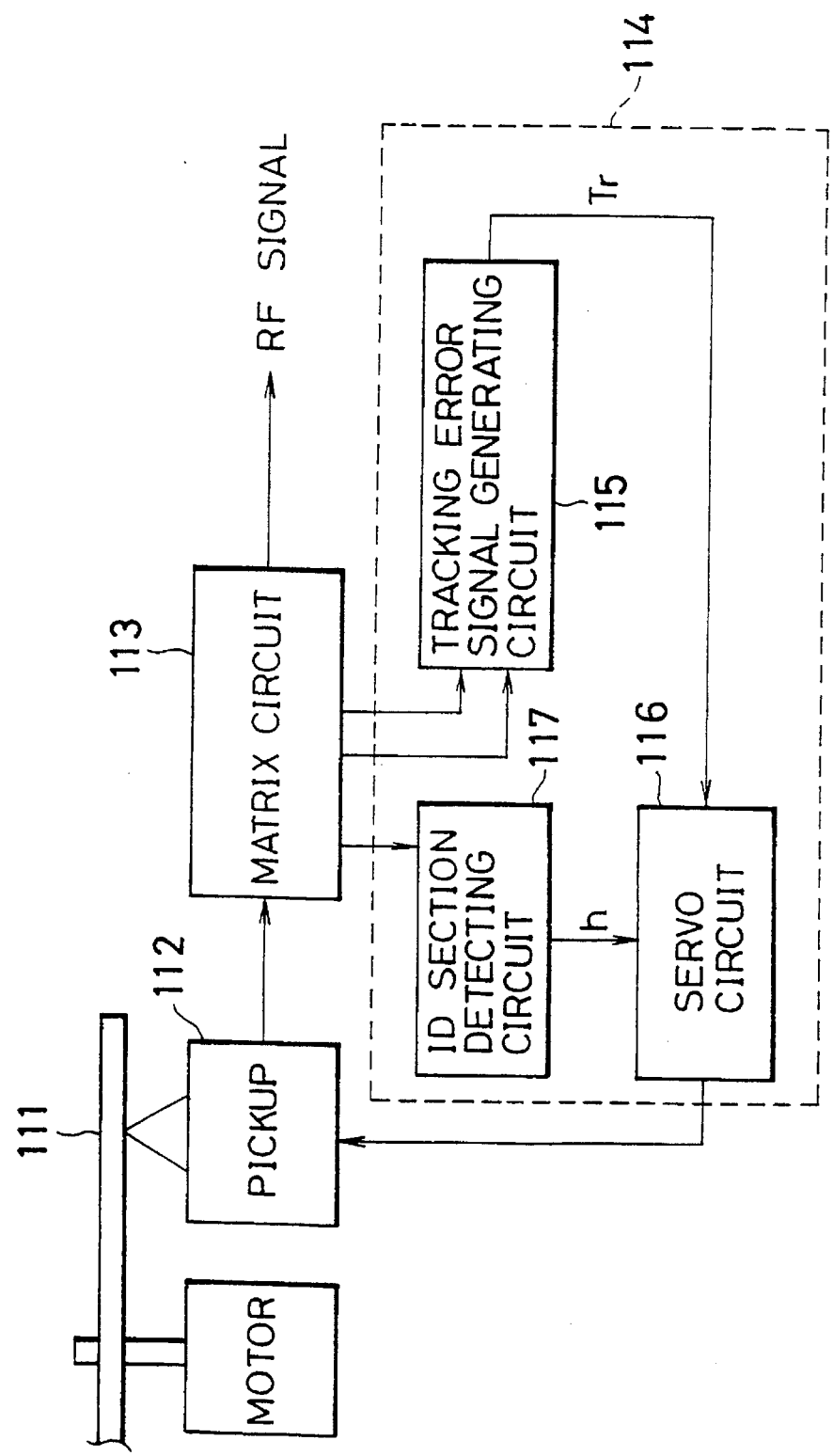

DATA SECTION

ID SECTION

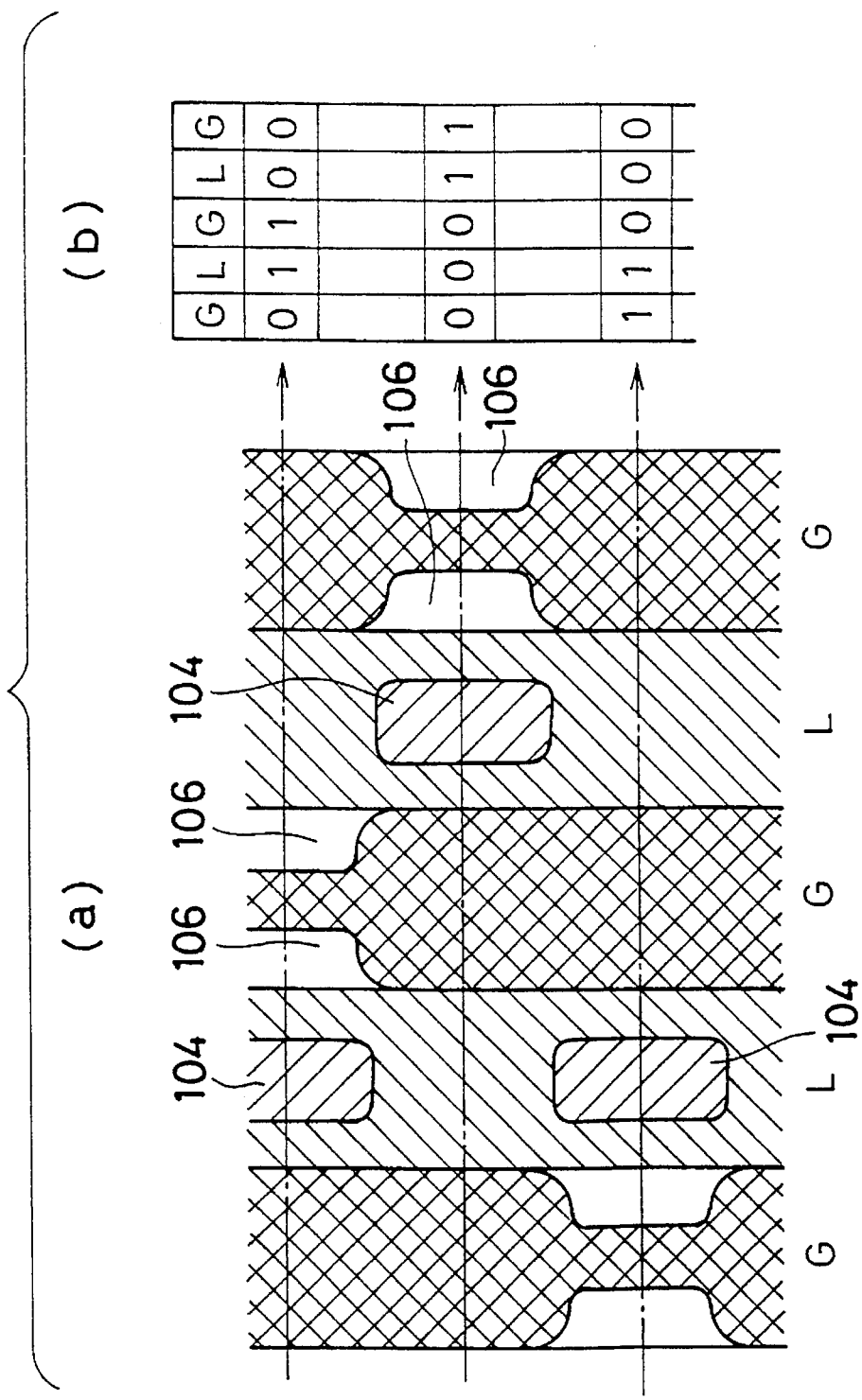

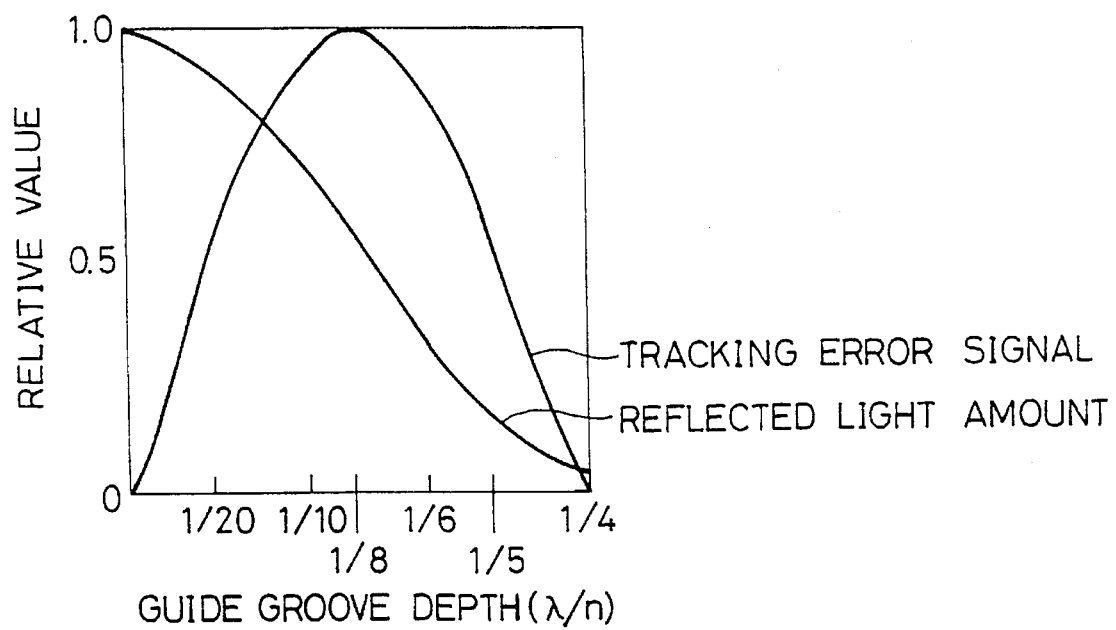

LIGHT REFLECTED ON GROOVE MARK

——— LARGE LIGHT AMOUNT
------ MEDIUM LIGHT AMOUNT
—·—·— SMALL LIGHT AMOUNT (LIGHT REFLECTED ON LAND MARK)

——— LARGE LIGHT AMOUNT

—·—·— MEDIUM LIGHT AMOUNT

——--—— SMALL LIGHT AMOUNT (LIGHT REFLECTED ON GROOVE MARK)

—— LARGE LIGHT AMOUNT

—‑—‑— MEDIUM LIGHT AMOUNT

—‧—‧— SMALL LIGHT AMOUNT

OPTICAL RECORDING MEDIUM HAVING PRE-FORMATTED PATTERNS ARRANGE BY SHIFTING PHASES

BACKGROUND OF THE INVENTION

1. Field of the Invention

The present invention relates to an optical information recording medium such as optical disks of a phase changing type and a write-once type and a magnetooptic disk for performing land and groove recording operations. The present invention also relates to an optical information recording-regenerating apparatus such as an optical disk drive unit for operating an optical disk and recording and regenerating optical information.

2. Description of the Related Art

An optical disk drive unit for operating an optical information recording medium such as an optical disk and a magnetooptic disk generally uses a recording system for realizing a high density record. This recording system is constructed by a ZCAV (Zoned Constant Angular Velocity) system, a system for reducing a wavelength of a laser diode, a PWM (pit edge recording) system, a land-groove recording system, etc. In the land-groove recording system, data are recorded to both land and groove portions formed by tracks formed on the optical information recording medium (which is called an optical disk in the following description). Accordingly, a data recording density in the land-groove recording system can be doubled in comparison with a general recording system in which data are recorded to only the land or groove portion.

The land-groove recording system in the above high density recording systems particularly has a problem about an error in detection of ID (identification) information and information data by crosstalk between the land and groove portions adjacent to each other. FIG. 1 shows an example for canceling such crosstalk in the land-groove recording system. This example is disclosed as "High Track Density Magneto-optical recording Using a Crosstalk Canceler" in Optical Data Strage '90. In FIG. 1, a land portion 2 and a groove portion 3 are alternately arranged on a face of a magnetooptic disk 1. Recording pits 4 are formed in both regions for the land portion 2 and the groove portion 3. At a data regenerating time, three beams a, b and c are irradiated onto the magnetooptic disk 1 from a three-beam magnetooptic head 5 to read three signals composed of a main signal d, subsignals e and f. The read three signals are transmitted to an adaptive type digital filter 8 so that crosstalk at the data regenerating time is removed from these signals. After this crosstalk has been removed from these signals, it is possible to detect a main signal $d_0$ corresponding to a recording pit 4 of a data track as an object.

The crosstalk can be canceled by providing an optical pickup using three beams as shown in FIG. 1. However, in reality, high accuracy is required with respect to assembly of such an optical pickup and construction of electric circuits so that it is difficult to suitably assemble the optical pickup and construct the electric circuits. Further, cost of the optical pickup is increased so that no optical pickup can be practically used. Furthermore, in this case, there are problems about compatibility between the optical pickup and the general optical disk drive unit for recording data to only the land portion 2 or the groove portion 3. There are also problems about compatibility between the magnetooptic disk and the optical disk.

A memory capacity is gradually increased in a general apparatus for recording and regenerating optical information. Various kinds of recording systems are used to obtain a high density recording medium. For example, the recording systems are constructed by a system for reducing a wavelength of an LD (laser diode), a mark edge detecting system, a system for narrowing a track pitch (Tp) of the recording medium, etc. A drive unit using phase change (PC) media is recently manufactured as a product and technical advancement of this drive unit is expected. In one feature of the PC media, thermal conductivity is low and it is easy to control the size of a recording mark in comparison with magneto optical (MO) media. Accordingly, crosstalk can be restrained and the track pitch can be narrowed so that a land-groove recording system capable of most simply doubling a recording capacity is proposed. This land-groove recording system is disclosed as a "High Track Density Magnetooptical recording Using a Crosstalk Canceler" in Optical Data Strage '90. In such a land-groove recording system, the width of a land or groove generally playing the role of a guide groove is widened and data are also recorded to this groove by using three beams. Thus, two recording tracks can be formed at the narrow track pitch so that a high density record can be made.

The size of the recording mark can be easily controlled generally in the PC media so that crosstalk in a data section can be restrained by a general technique. However, a position information section such as a sector mark, an address, etc. not to be erased is recorded in advance by irregularities at a manufacturing time of the PC media. The position information section is called an ID section in the following description. No problems about the ID section can be solved since the ID section constitutes features of the PC media. In particular, existence or nonexistence of a mark is judged by existence or nonexistence of a groove of the PC media in the ID section of a pregroove format. However, a light spot reaches a groove portion in tracking of a land portion so that large crosstalk is caused by existence and nonexistence of a groove in an adjacent groove portion. Accordingly, no information of the PC media can be exactly detected.

The above system using three beams is used as a system for removing crosstalk in the land portion in the groove preformat ID section in the land-groove recording system. In this three-beam system, the three beams are adjusted to remove the crosstalk. However, in this three-beam system, it is necessary to arrange an adjusting mechanism which is very precise and special. Further, in this case, it is necessary to arrange laser diodes for emitting the three beams and a complicated circuit for separately detecting the three beams and making a calculation about these beams. As a result, problems are caused with respect to cost, durability, reliability, recording and regenerating efficiencies, a structural size. etc.

SUMMARY OF THE INVENTION

It is therefore an object of the present invention to provide an optical information recording medium and an optical information recording-regenerating apparatus for restraining crosstalk.

In accordance with a first construction of the present invention, the above object can be achieved by an optical information recording medium in which information of a data format constructed by an ID section and a data section can be recorded and regenerated from both regions for a land portion and a groove portion formed on a disk face; the optical information recording medium being constructed such that information such as an address is recorded to the ID section as a format by a PPM recording system when information is recorded to the data section by a PWM recording system.

In accordance with a second construction of the present invention, the above object can be also achieved by an optical information recording medium in which information of a data format constructed by an ID section and a data section in one sector can be recorded and regenerated from both regions for a land portion and a groove portion formed on a disk face; the ID section being constructed such that the ID section has no sector mark formed by a unique pattern irrespective of a modulating code rule used to detect a leading position of each of sectors.

In accordance with a third construction of the present invention, the above object can be also achieved by an optical disk drive unit in which recording and regenerating operations, etc. of a data format constructed by an ID section and a data section can be performed in both regions for a land portion and a groove portion of an optical information recording medium; the optical information recording medium being constructed such that the ID section has no sector mark formed by a unique pattern irrespective of a modulating code rule used to detect a leading position of each of sectors; and the optical disk drive unit comprising a sector leading position detecting means for detecting a leading position of each of the sectors by calculating a DC level difference between regenerating signals obtained from the ID section and the data section having a special pattern in this optical information recording medium.

In accordance with a fourth construction of the present invention, the above object can be also achieved by an optical disk drive unit in which recording and regenerating operations, etc. of a data format constructed by an ID section and a data section can be performed in both regions for a land portion and a groove portion of an optical information recording medium; the optical information recording medium being constructed such that the ID section has no sector mark formed by a unique pattern irrespective of a modulating code rule used to detect a leading position of each of sectors; and the optical disk drive unit comprising a sector leading position detecting means for detecting a leading position of each of the sectors by detecting a prepit nonexisting area of continuous plural bytes by a regenerating signal from this optical information recording medium and next detecting a VFO pattern formed as a preformat in the ID section.

In accordance with a fifth construction of the present invention, the above object can be also achieved by an optical disk drive unit in which recording and regenerating operations, etc. of a data format constructed by an ID section and a data section can be performed in both regions for a land portion and a groove portion of an optical information recording medium; the optical information recording medium being constructed such that the ID section has no sector mark formed by a unique pattern irrespective of a modulating code rule used to detect a leading position of each of sectors; and the optical disk drive unit comprising a first sector leading position detecting means for detecting a leading position of each of the sectors by calculating a DC level difference between regenerating signals obtained from the ID section and the data section having a special pattern in this optical information recording medium; and a second sector leading position detecting means for detecting a leading position of each of the sectors by detecting a prepit nonexisting area of continuous plural bytes by the regenerating signals from the optical information recording medium and next detecting a VFO pattern formed as a preformat in the ID section.

In accordance with a sixth construction of the present invention, the above object can be also achieved by an optical information recording medium in which information of a data format constructed by an ID section and a data section in one sector can be recorded and regenerated from both regions for a land portion and a groove portion formed on a disk face; and the optical information recording medium being constructed such that a pattern formed as a preformat in the ID section is arranged by shifting phases from each other in the land portion and the groove portion adjacent to each other and forming this pattern.

In accordance with a seventh construction of the present invention, the above object can be also achieved by an optical information recording medium in which information of a data format constructed by an ID section and a data section in one sector can be recorded and regenerated from both regions for a land portion and a groove portion formed on a disk face; and the optical information recording medium being constructed such that a pattern formed as a preformat in a VFO area within the ID section is arranged by shifting phases from each other by 180° or so in the land portion and the groove portion adjacent to each other and forming this pattern.

In the first construction of the present invention, crosstalk in the ID section as a maximum defect can be restrained by recording data to the ID section by the PPM recording system in comparison with a case in which the land-groove recording system and the PWM recording system are used.

In the second construction of the present invention, the ID section has no sector mark formed by a unique pattern irrespective of a modulating code rule used to detect a leading position of each of sectors. Accordingly, the general sector mark arranged for only detection of the leading position of each of the sectors can be removed from the ID section so that a bad influence from the sector mark causing largest crosstalk can be removed.

In the third construction of the present invention, a DC level difference between regenerating signals of the ID section and the data section is detected instead of the sector mark by the sector leading position detecting means so that the leading position of each of the sectors can be detected by a very simple construction.

In the fourth construction of the present invention, the prepit nonexisting area of continuous bytes is detected instead of the sector mark by the sector leading position detecting means. Next, the VFO pattern formed as a preformat in the ID section is detected by the sector leading position detecting means. Accordingly, the leading position of each of the sectors can be detected by a very simple construction.

In the fifth construction of the present invention, the leading position of each of the sectors instead of the sector mark can be detected more reliably and accurately by commonly using the first and second sector leading position detecting means.

In the sixth construction of the present invention, a pattern formed as a preformat in the ID section is arranged by shifting phases from each other in the adjacent land and groove portions. Accordingly, it is possible to prevent the amplitude of a regenerating signal from being reduced by crosstalk between the adjacent land and groove portions.

In the seventh construction of the present invention, a pattern formed as a preformat in the VFO area within the ID section is arranged by shifting phases from each other by 180° or so in the adjacent land and groove portions. Accordingly, it is possible to reduce a bad influence caused by crosstalk between the land and groove portions in the VFO area having a lowest intensity level of a regenerating signal in the ID section.

In accordance with an eighth construction of the present invention, the above object can be also achieved by an optical information recording medium comprising a land portion and a groove portion formed in a spiral or concentric shape; a land mark formed in a position information section of the land portion and constructed by a pit recorded as position information; and a groove mark formed in a position information section of the groove portion and constructed by an interrupting portion between grooves and recorded as independent position information different from the position information of the land portion.

In accordance with a ninth construction of the present invention, a tracking directional length of the land mark formed in the position information section of the land portion is different from that of the groove mark formed in the position information section of the groove portion in the eighth construction of the present invention.

In accordance with a tenth construction of the present invention, at least a land width of the position information section of the land portion is set to be wider than a groove width of the position information section of the groove portion in the eighth construction of the present invention.

In accordance with an eleventh construction of the present invention, the above object can be also achieved by an optical information recording medium comprising a land portion and a groove portion formed in a spiral or concentric shape; a land mark formed in a position information section of the land portion and constructed by a pit recorded as position information; and a groove mark formed in a position information section of the groove portion and constructed by a change in groove width and recorded as independent position information different from the position information of the land portion.

In accordance with a twelfth construction of the present invention, the above object can be also achieved by an optical information recording medium comprising a land portion and a groove portion formed in a spiral or concentric shape; a land mark formed in a position information section of the land portion and constructed by a pit recorded as position information; and a groove mark formed in a position information section of the groove portion such that a groove is removed from only this position information section of the groove portion; the groove mark being constructed by a pit recorded as independent position information different from the position information of the land portion.

In accordance with a thirteenth construction of the present invention, the above object can be also achieved by an optical information recording-regenerating apparatus using an optical information recording medium and recording and regenerating information from the optical information recording medium; the optical information recording medium comprising a land portion and a groove portion formed in a spiral or concentric shape; a land mark formed in a position information section of the land portion and constructed by a pit recorded as position information; and a groove mark formed in a position information section of the groove portion such that a groove is removed from only this position information section of the groove portion. The groove mark is constructed by a pit recorded as independent position information different from the position information of the land portion. The optical information recording-regenerating apparatus comprises position information section tracking control means for holding an operation of tracking correcting means just before the position information section having no groove in tracking of this position information section; the position information section tracking control means returning the operation of the tracking correcting means to a normal operation after termination of the tracking of the position information section.

In accordance with a fourteenth construction of the present invention, the above object can be also achieved by an optical information recording medium comprising a land portion and a groove portion formed in a spiral or concentric shape and able to independently record information; and a groove mark having a depth g and recorded as position information on a plane having a depth −e when a groove face of the groove portion has a depth +d with a land face of the land portion within a position information section as a reference.

In accordance with a fifteenth construction of the present invention, the groove mark within the position information section is formed in a shape for providing a reflected light amount equal to that of the land mark formed within this position information section in the fourteenth construction of the present invention.

In accordance with a sixteenth construction of the present invention, the above object can be also achieved by an optical information recording-regenerating apparatus using a first or second optical information recording medium; the first optical information recording medium comprising a land portion and a groove portion formed in a spiral or concentric shape and able to independently record information; and a groove mark having a depth g and recorded as position information on a plane having a depth −e when a groove face of the groove portion has a depth +d with a land face of the land portion within a position information section as a reference; the second optical information recording medium being constructed such that the groove mark within the position information section is formed in a shape for providing a reflected light amount equal to that of the land mark formed within this position information section. The optical information recording-regenerating apparatus records and regenerates information from each of the first and second optical information recording media. The optical information recording-regenerating apparatus comprises mark detecting means for detecting a mark recorded within the position information section of each of the first and second optical information recording media. The mark detecting means equally detects this mark in the land portion and the groove portion.

In the eighth construction of the present invention, independent unrewritable position information can be obtained in a high density state in each of the position information sections of the land portion and the groove portion within the same recording medium. Further, this position information of the recording medium in the high density state is accurately held so that a reliable recording medium can be obtained. Such a recording medium can be realized by using a general stamper manufacturing system.

In the ninth construction of the present invention, influences of existence and nonexistence of the marks in the groove portion providing large crosstalk can be reduced by changing mark lengths in the land and groove portions when recording and regenerating conditions are equal to each other in a land-groove recording system. The crosstalk can be removed from the groove portion by using a filter when the recording and regenerating conditions are different from each other.

In the tenth construction of the present invention, a crosstalk amount caused by the groove mark can be reduced at a tracking time of the land portion by setting a land width to be wider than a groove width.

In the eleventh construction of the present invention, existence and nonexistence of a mark detected in the position information section of the groove portion correspond to a change in a groove width. Accordingly, a crosstalk amount caused by the groove mark can be reduced at a tracking time of the land portion.

In the twelfth construction of the present invention, existence and nonexistence of a mark detected in the position information section of the groove portion correspond to existence and nonexistence of a pit instead of an interrupting portion between grooves. Accordingly, a crosstalk amount can be reduced irrespective of land tracking or groove tracking.

In the thirteenth construction of the present invention, the operation of the tracking correcting means is held by the position information section tracking control means just before an optical pickup is moved into a position information section having no groove. Accordingly, no tracking correcting means follows a scanning disturbance caused by nonexistence of a tracking error signal when the optical pickup is moved into this position information section. Further, an operation of the optical information recording-regenerating apparatus can be rapidly returned to a tracking operation after the position information section is completely detected.

In the fourteenth construction of the present invention the groove mark in the groove portion has a special shape so that contrast between existence and nonexistence of the groove mark can be set to be clear. Further, it is possible to greatly reduce crosstalk with respect to an adjacent land portion.

In the fifteenth construction of the present invention, the reflected light amounts in the position information sections of the land and groove portions are set to be equal to each other. Accordingly, position information can be accurately regenerated without changing regenerating systems in the position information sections of the land and groove portions.

In the sixteenth construction of the present invention, regenerating circuits in the land and groove portions can be set to be equal to each other. Accordingly, it is not necessary to change polarities of a regenerating circuit in the land and groove portions as in the general case. Therefore, a circuit construction of the optical information recording-regenerating apparatus can be simplified.

Further objects and advantages of the present invention will be apparent from the following description of the preferred embodiments of the present invention as illustrated in the accompanying drawings.

BRIEF DESCRIPTION OF THE DRAWINGS

FIG. 8$a$ is a typical view showing an example of modulating codes within an ID section of an optical information recording medium in an optical disk drive unit having a fifth construction in accordance with one embodiment of the present invention;

FIG. 8$b$ is a typical view showing an example of modulating codes within an ID section of an optical information recording medium having a sixth construction in accordance with one embodiment of the present invention;

FIG. 10($a$) is a cross-sectional view of a position information section in a general optical information recording medium for only a groove preformat;

FIG. 10($b$) is a cross-sectional view of a position information section in a general optical information recording medium for only a land preformat;

FIG. 13($b$) is a plan view of a general position information section;

FIG. 14($b$) is a plan view showing influences of crosstalk in a general position information position;

FIG. 16 is a block diagram showing the construction of an optical information recording-regenerating apparatus having a thirteenth construction in accordance with one embodiment of the present invention;

FIG. 17(a,b) shows the construction of an optical information recording medium having a fourteenth construction in accordance with one embodiment of the present invention in which

FIG. 18 is a typical view showing a surface shape of the optical information recording medium and an output state of optical information in a region corresponding to this surface shape;

FIG. 19 is a characteristic graph showing states of a signal intensity level and a reflected light amount with respect to the depth of a guide groove;

DESCRIPTION OF THE PREFERRED EMBODIMENTS

The preferred embodiments of an optical information recording medium and an optical information recording-regenerating apparatus in the present invention will next be described in detail with reference to the accompanying drawings.

Figure 1:
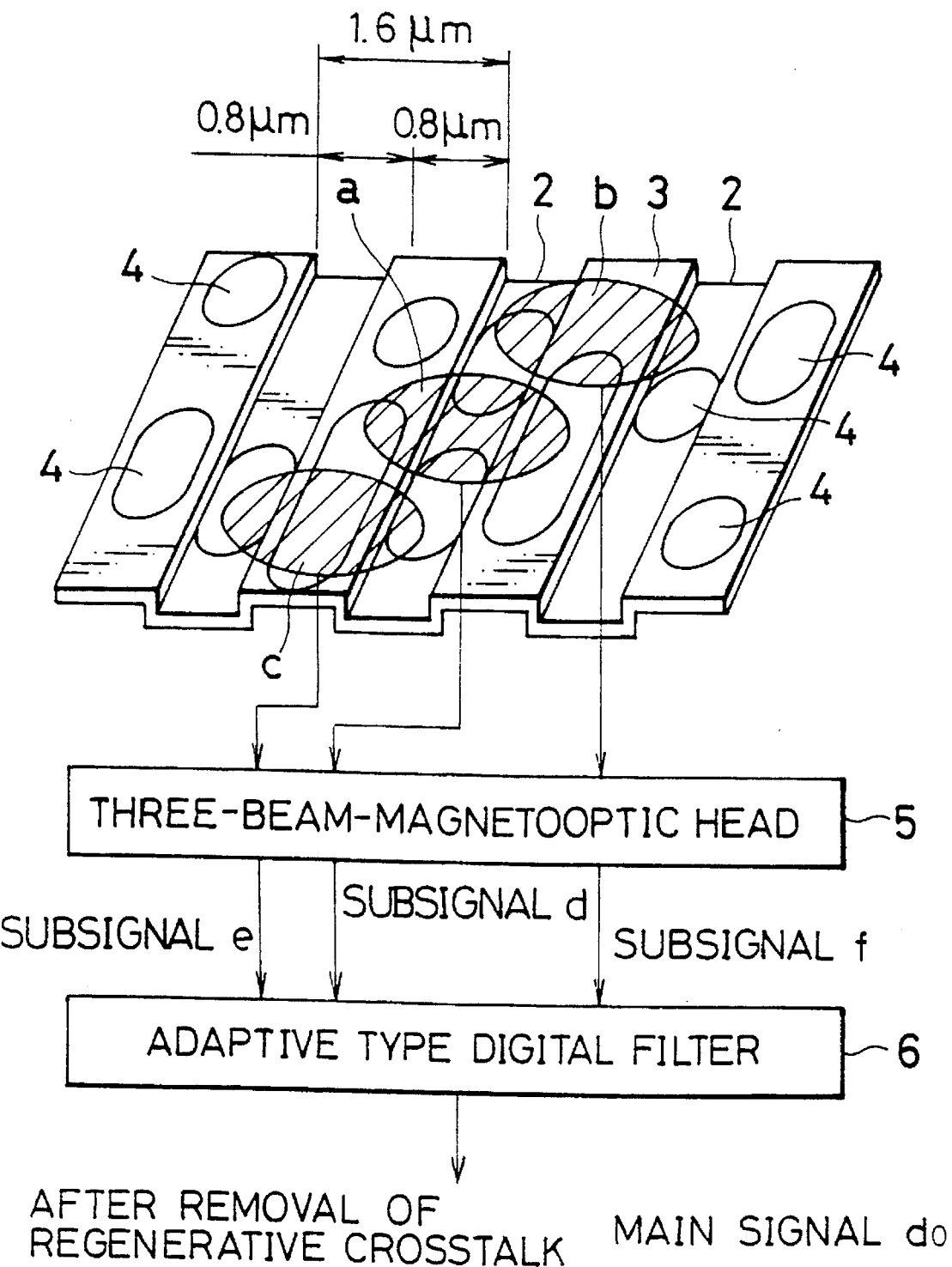
FIG. 1 is a typical view showing a system for canceling crosstalk in a general land-groove recording system.

An optical information recording medium in accordance with one embodiment of the present invention will first be explained with reference to FIG. 2. The same constructional portions as the above-mentioned general example shown in FIG. 1 are designated by the same reference numerals.

Figure 2:
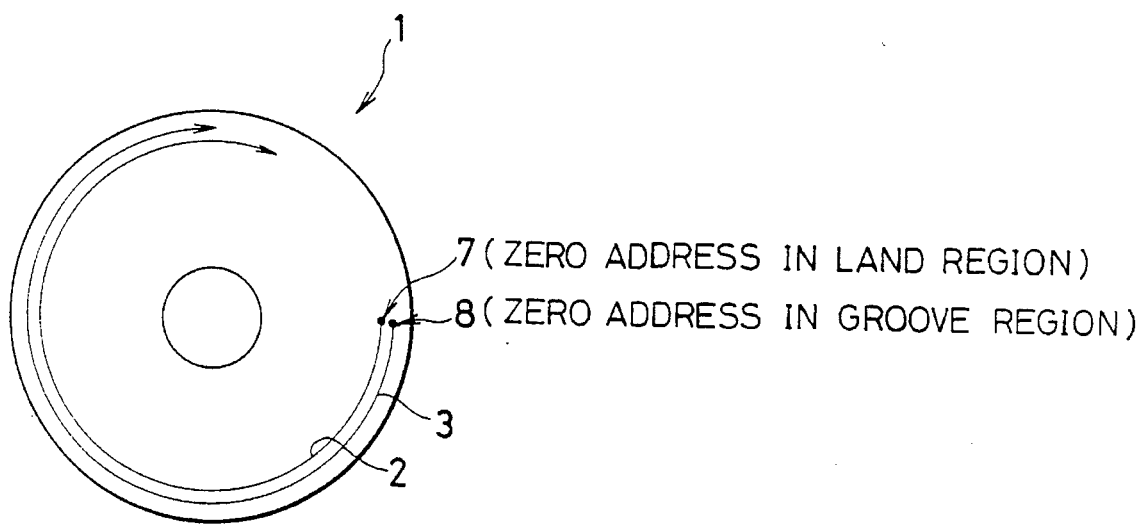
FIG. 2 is a plan view showing a state of a disk face of an optical information recording medium in accordance with one embodiment of the present invention.

FIG. 2 shows a face state of a magnetooptic disk 1 as an optical information recording medium. The magnetooptic disk 1 may be constructed by an optical disk. This magnetooptic disk 1 has a land portion 2 and a groove portion 3 by forming tracks on this disk face. Information can be recorded and regenerated from both regions for the land portion 2 and the groove portion 3. In this magnetooptic disk 1, a data area starting address in each of the land portion 2 and the groove portion 3 is arranged in alignment with an inner circumferential side position or an outer circumferential side position on the disk face. In this embodiment, the data area starting address is arranged in alignment with the outer circumferential side position. The data area starting address is also called a zero address. Namely, a position of the data area starting address 7 of the land portion 2 and a position of the data area starting address 8 of the groove portion 3 are aligned with each other as shown in FIG. 2.

For example, data are recorded as follows by aligning the positions of the data area starting addresses 7 and 8 with each other. First, data are recorded to a recording area from the position of the data area starting address 7 of the land portion 2. When the optical information recording medium runs out of the recording area of the land portion 2, a data recording position is returned to the position of the data area starting address 8 of the groove portion 3 and data can be recorded in the same circumferential direction from this address position. Accordingly, when a data recording operation is performed from the land portion 2 to the groove portion 3, no spindle motor for rotating the magnetooptic disk 1 is reversely rotated so that data can be efficiently recorded and regenerated from the magnetooptic disk 1 by a simple construction with high accuracy.

It is also possible to very easily provide compatibility between this optical information recording medium and a general type optical information recording medium for recording data to only the land portion 2 or the groove portion 3. Further, it is possible to very easily provide compatibility between an optical disk drive unit used for the optical information recording medium of the present invention and a general optical disk drive unit used for the general type optical information recording medium. For example, similar to the above-mentioned construction, an address provided by adding value 1 to a final address of the groove portion 3 may be set to a starting address of the land portion 2 such that this starting address is adjacent to the data area starting address 8 as a zero address of the groove portion 3.

This embodiment is also characterized in the following constructional elements. Namely, in an unillustrated optical disk drive unit, information control such as information record and regeneration, etc. can be performed in both regions for the land portion 2 and the groove portion 3 of the magnetooptic disk 1. This optical disk drive unit has an unillustrated land portion groove portion separating information control means for controlling information with each of the land portion 2 and the groove portion 3 as an independent separate recording medium. For example, when a recording operation of information is controlled with respect to the land portion 2 and the groove portion 3 by using the magnetooptic disk 1 as shown in FIG. 2, the land portion groove portion separating information control means can be operated as a dedicated drive unit for recording information to only the land portion 2 in the recording operation of the land portion 2, and can be operated as a dedicated drive unit for recording information to only the groove portion 3 in the recording operation of the groove portion 3. Accordingly, it is possible to very easily secure compatibility between the optical information recording medium and a general type optical information recording medium for recording data to only the land portion 2 or the groove portion 3. Further, it is possible to very easily secure compatibility between the optical disk drive unit and a general optical disk drive unit used for the general type optical information recording medium.

In this embodiment, the optical disk drive unit has the land portion groove portion separating information control means capable of independently controlling the land portion 2 and the groove portion 3. This optical disk drive unit further has an unillustrated recording area switching inhibiting means for inhibiting that continuous data are recorded by alternately switching recording areas of the land portion 2 and the groove portion 3 when the continuous data are recorded. Since this recording area switching inhibiting means is arranged, no frequent switching operation is required between the land portion 2 and the groove portion 3 when data are recorded to the recording areas of the land portion 2 and the groove portion 3. Therefore, data can be recorded without wasting a useless switching time. Data can be also regenerated smoothly by a construction similar to this construction.

An optical information recording medium having a third construction in accordance with one embodiment of the present invention will next be explained with reference to FIG. 3. The same constructional portions as FIG. 2 are designated by the same reference numerals. Therefore, an explanation about these constructional portions is omitted in the following description.

Figure 3:
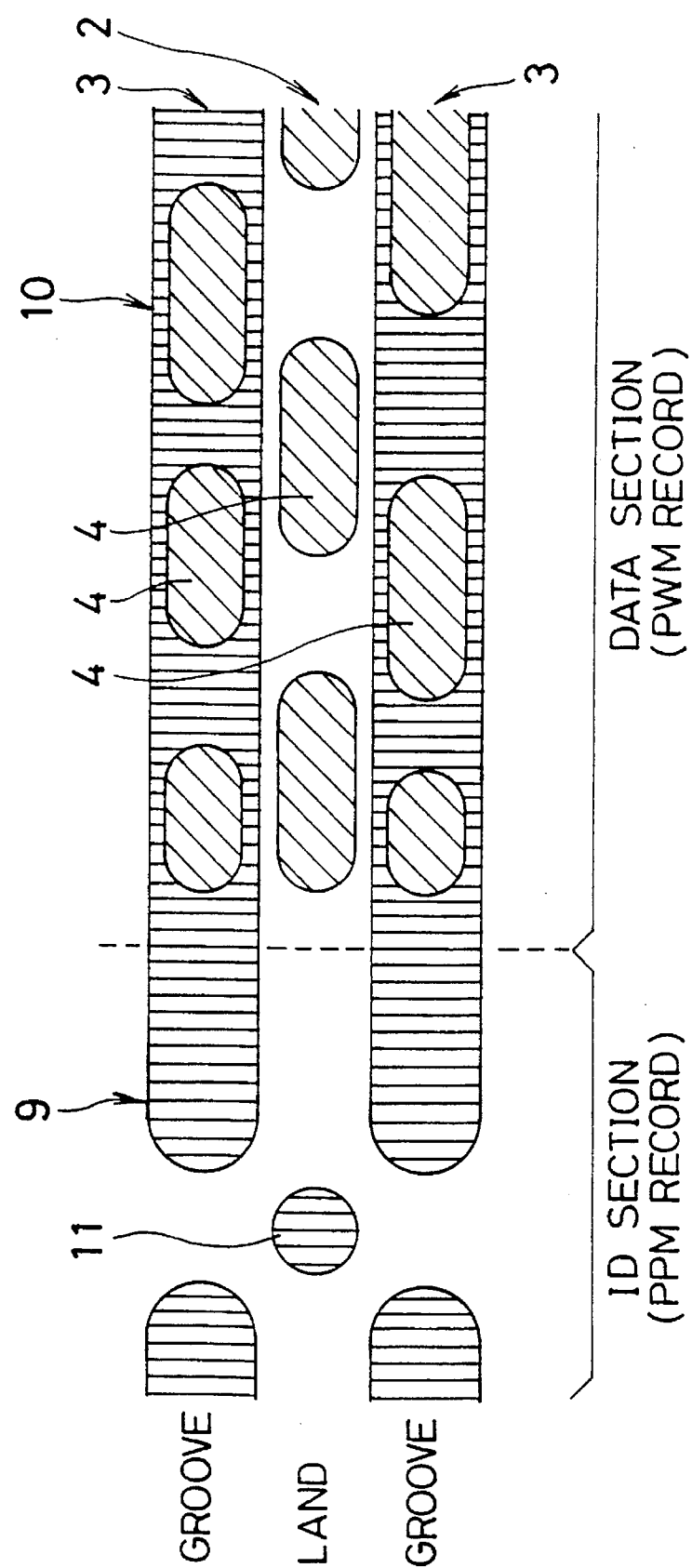
FIG. 3 is a plan view showing states of an ID section and a data section of an optical information recording medium having a first construction in accordance with one embodiment of the present invention.

In this embodiment, as shown in FIG. 3, the optical information recording medium can record and regenerate information of a data format composed of an ID section 9 and a data section 10 in both regions for a land portion 2 and a groove portion 3 formed on a disk face. This optical information recording medium is characterized in that information such as addresses, etc. is recorded to the ID section 9 as a format by a PPM recording system when information in the data section 10 is recorded in a PWM (pit edge record) system. For example, the optical information recording medium can be constructed by a magnetooptic disk 1 as shown in FIG. 2. FIG. 3 shows a face state of this magnetooptic disk 1. A recording pit 4 is recorded by the PWM recording system to the land portion 2 and the groove portion 3 in the data section 10. A recording pit 11 is recorded by the PPM recording system to the land portion 2 and the groove portion 3 in the ID section 9. Accordingly, information from the ID section 9 can be discriminated from information from the data section 10 in regeneration by using the PPM recording system in the ID section 9 different from the PWM recording system in the data section 10. Thus, a land-groove recording system and the PWM recording system can be commonly used while crosstalk in the ID section 9 as a maximum defect in the land-groove recording system is sufficiently restrained. Accordingly, it is possible to realize a high density record with high accuracy.

An optical information recording medium having a second construction in accordance with one embodiment of the present invention will next be explained with reference to FIGS. 4 and 5. The same constructional portions as FIGS. 2 and 3 are designated by the same reference numerals and an explanation about these constructional portions is omitted in the following description.

In the optical information recording medium in this embodiment, a data format is constructed such that one sector is composed of an ID section 9 and a data section 10. Information of this data format can be recorded and regenerated from both regions for a land portion 2 and a groove portion 3 formed on a disk face. For example, this optical information recording medium is constructed by a magnetooptic disk. The ID section 9 has no sector mark formed by a unique pattern irrespective of a modulating code rule used to detect a leading position of each of sectors.

Figure 4:
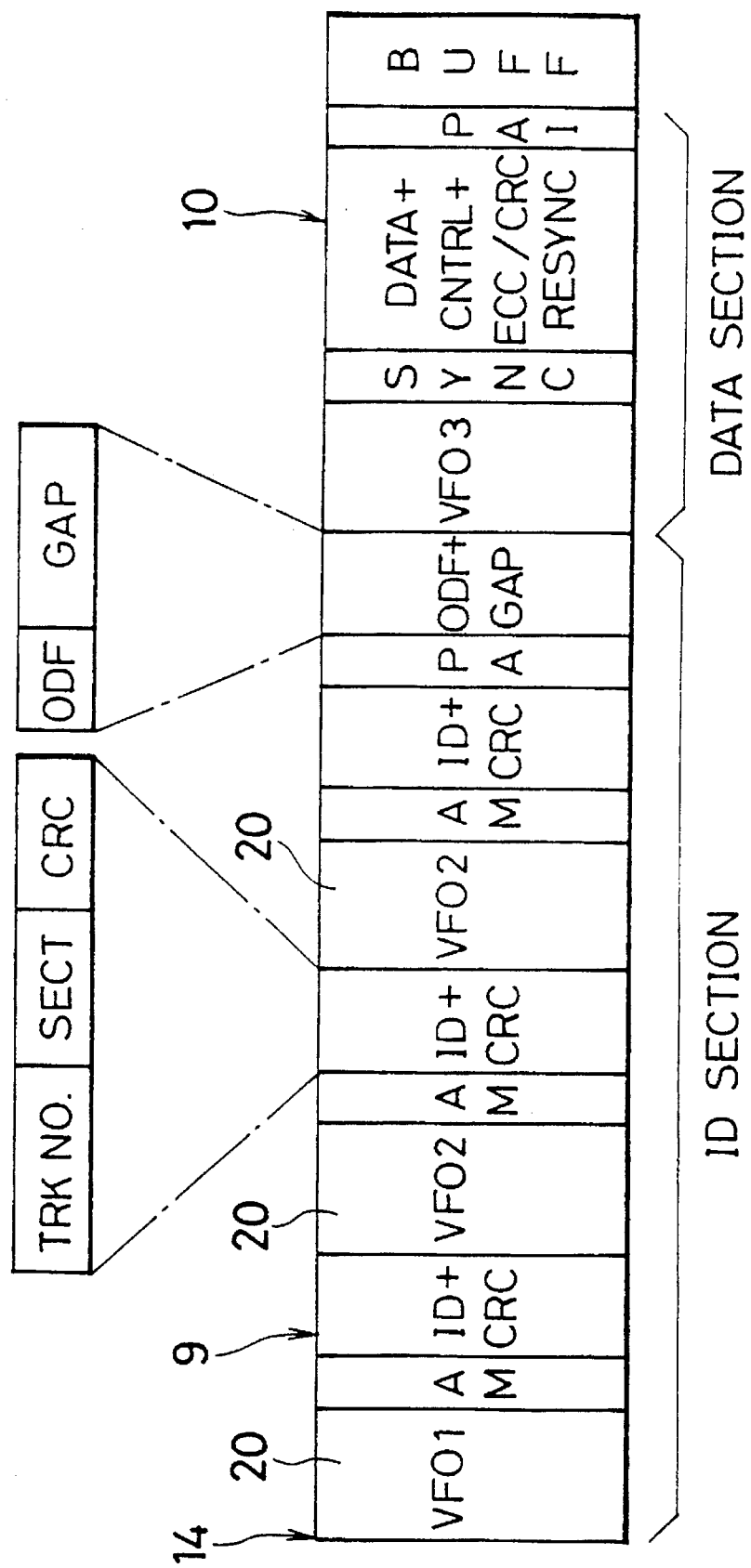
FIG. 4 is a typical view showing the construction of a format within a sector of the optical information recording medium having the first construction of the present invention.
Figure 5:
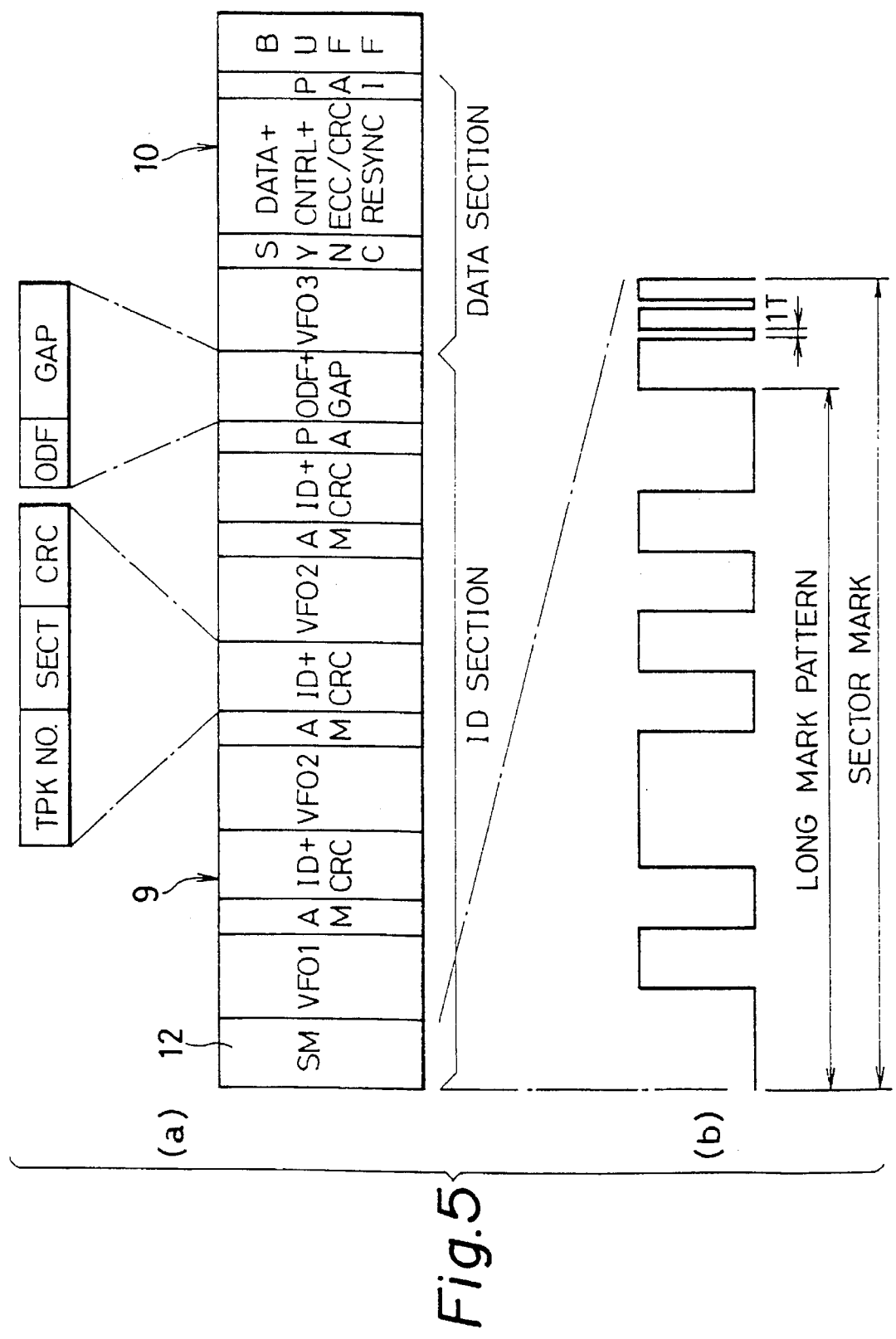
FIG. 5 is a typical view showing the construction of a format within a sector of an optical information recording medium having a second construction in accordance with one embodiment of the present invention.

FIG. 4 shows a construction of the ID section 9 formed by the format having a special pattern. In contrast to this, FIG. 5(a) shows a construction of the ID section 9 within one sector generally used and constructed such that a sector mark (SM) 12 is included in a leading position. Since the sector mark (SM) 12 is removed from the ID section 9, it is possible to remove largest crosstalk within the ID section 9 as a maximum defect in the land-groove recording system caused by a long mark pattern 13 in the sector mark (SM) 12 as shown in FIG. 5(b). Accordingly, a high density record can be made with high accuracy by applying the land-groove recording system to such a format construction.

An optical disk drive unit having a third construction in accordance with one embodiment of the present invention will next be explained with reference to FIG. 6. The same constructional portions as FIGS. 2 to 5 are designated by the same reference numerals and an explanation about these constructional portions is omitted in the following description.

In the unillustrated optical disk drive unit in this embodiment, information of a data format composed of an ID section 9 and a data section 10 can be recorded and regenerated from both regions for a land portion 2 and a groove portion 3 of an optical information recording medium. For example, a magnetooptic disk is used as the optical information recording medium. The optical information recording medium is constructed as shown in FIG. 4. Namely, the ID section 9 in the optical information recording medium has no sector mark (SM) 12 formed by a unique pattern irrespective of a modulating code rule used to detect a leading position of each of sectors.

The optical disk drive unit has an unillustrated sector leading position detecting means for detecting the leading position of each of the sectors by calculating a difference in DC level between regenerating signals (RF signals) obtained from the ID section 9 and the data section 10 having a special pattern of this optical information recording medium.

Figure 6:
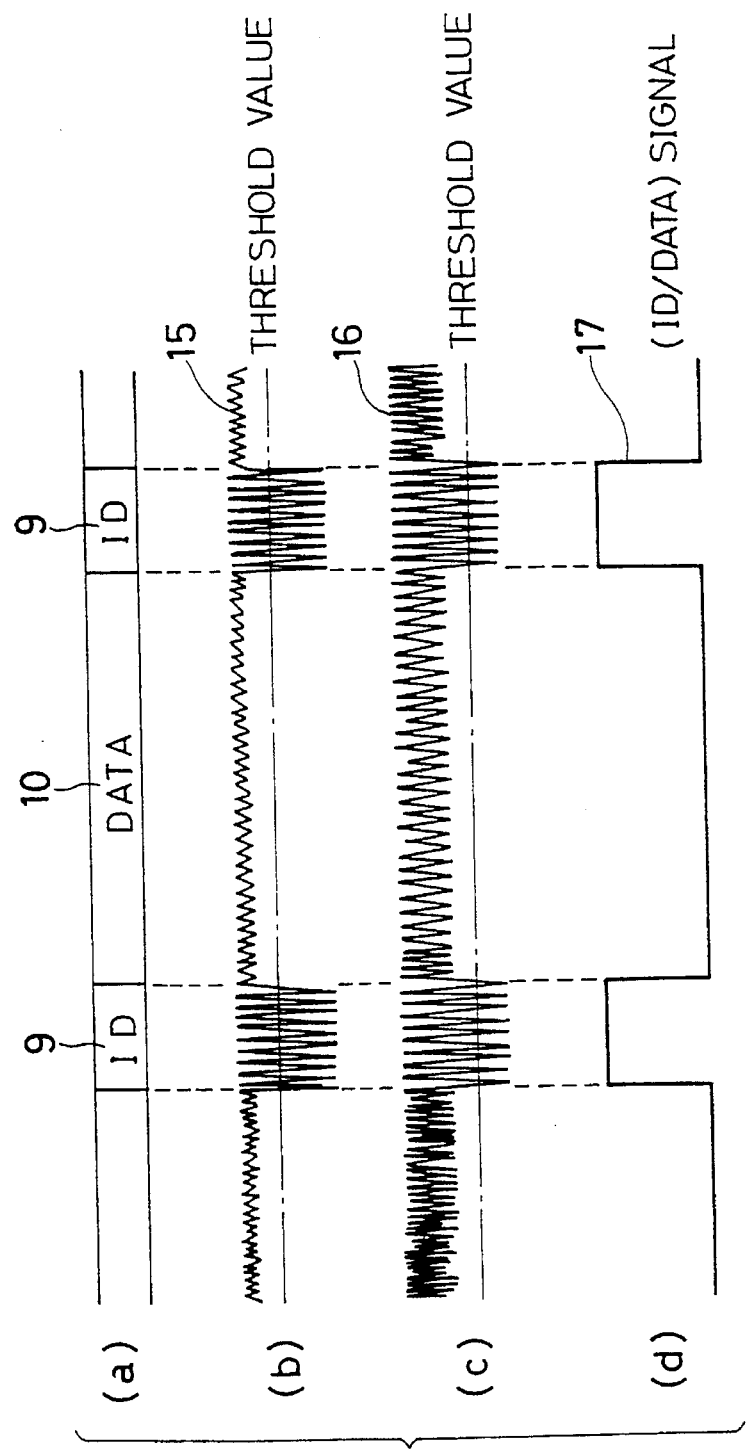
FIG. 6 is a waveform chart showing a detecting example of a sector leading position of an optical information recording medium in an optical disk drive unit having a third construction in accordance with one embodiment of the present invention.

FIG. 6 shows a detecting example of the sector leading position 14 including no sector mark (SM) 12 and detected by using this sector leading position detecting means. This sector leading position 14 is a leading position of VFO1 in FIG. 4. In this case, FIG. 6(a) shows a change in an RF signal 15 magnetooptically recorded from the magnetooptic disk. FIG. 6(b) shows a change in an RF signal 16 recorded by a change in phase from the magnetooptic disk. A signal 17 having a pulse waveform as shown in FIG. 6(c) can be calculated by comparing DC levels from the ID section 9 and the data section 10 formed by the special pattern with threshold values. Thus, the leading position 14 of each of the sectors can be reliably detected by a very simple construction even when there is no sector mark (SM) 12. Therefore, it is possible to remove a bad influence from the sector mark (SM) 12 causing largest crosstalk. Accordingly, a high density record can be made with high accuracy by applying such a detecting system to the land-groove recording system.

An optical disk drive unit having each of fourth and fifth constructions of the present invention will next be explained with reference to FIG. 7. The same constructional portions as FIGS. 2 to 6 are designated by the same reference numerals and an explanation about these constructional portions is omitted in the following description.

In the unillustrated optical disk drive unit, recording and regenerating operations of information of a data format composed of an ID section 9 and a data section 10, etc. are performed in both regions for a land portion 2 and a groove portion 3 of an optical information recording medium. For example, the optical information recording medium is constructed by a magnetooptic disk. The ID section 9 in the optical information recording medium has no sector mark (SM) 12 formed by a unique pattern irrespective of a modulating code rule used to detect a leading position of each of sectors. The optical disk drive unit has an unillustrated sector leading position detecting means. The sector leading position detecting means detects a prepit nonexisting area of continuous plural bytes by a regenerating signal from this optical information recording medium. The sector leading position detecting means next detects a leading position 14 of each of the sectors by detecting a VFO pattern formed as a preformat in the ID section 9.

Figure 7:
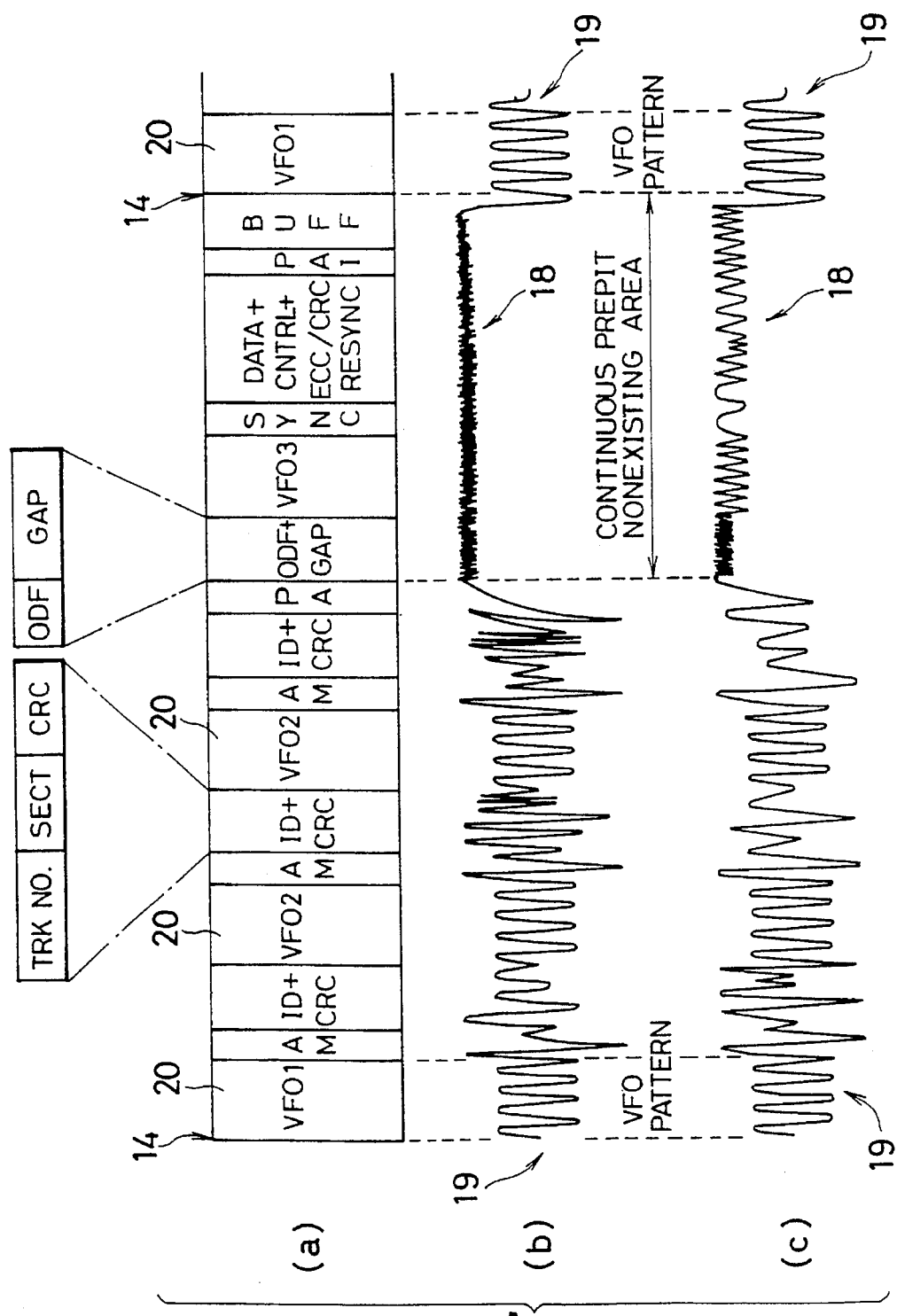
FIG. 7 is a waveform chart showing a detecting example of a sector leading position of an optical information recording medium in an optical disk drive unit having a fourth construction in accordance with one embodiment of the present invention.

FIG. 7 shows a detecting example of the sector leading position 14 including no sector mark (SM) 12 and detected by using the sector leading position detecting means. Items (a) and (b) in FIG. 7 respectively correspond to the above items (a) and (b) in FIG. 6 showing the magnetooptic disk. In this case, the sector leading position detecting means first detects the prepit nonexisting area 18 in which no prepit of continuous plural bytes exists. The sector leading position detecting means next detects the VFO pattern 19 formed as a preformat in the ID section 9. This VFO pattern 19 is normally a shortest repeating pattern of a used modulating code. Thus, it is possible to judge that a position of the detected VFO pattern 19 is a leading position of each of the sectors.

Thus, the leading position 14 of each of the sectors can be reliably detected by a very simple construction even when no sector mark (SM) 12 exists. Therefore, it is possible to remove a bad influence from the sector mark (SM) 12 causing largest crosstalk. Accordingly, a high density record can be made with high accuracy by applying such a detecting system to the land-groove recording system. The leading position of each of the sectors can be detected more reliably and accurately by commonly using the sector leading position detecting means (as a first sector leading position detecting means) based on the third construction shown in FIG. 6 and the sector leading position detecting means (as a second sector leading position detecting means) based on the fourth construction shown in FIG. 7.

An optical information recording medium having each of sixth and seventh constructions in accordance with one embodiment of the present invention will next be explained with reference to FIGS. 8a and 8b. The same constructional portions as FIGS. 2 to 7 are designated by the same reference numerals and an explanation about these constructional portions is omitted in the following description.

In this embodiment, one sector is constructed by an ID section 9 and a data section 10 in a data format of an optical information recording medium such as a magnetooptic disk. Information of the data format can be recorded and regenerated from both regions for a land portion 2 and a groove portion 3 formed on a disk face of the optical information recording medium. A pattern formed as a preformat in the ID section 9 is arranged by shifting phases from each other in the land portion 2 and the groove portion 3 adjacent to each other and forming this pattern.

FIG. 8a shows a pattern formed as a preformat in the ID section 9 at a time of RLL(2,7) modulation. Since the pattern is arranged by shifting phases from each other between the land portion 2 and the groove portion 3, crosstalk can be reduced between the land portion 2 and the groove portion S adjacent to each other in regeneration. Therefore, it is possible to prevent the amplitude of a regenerating signal from being reduced. Accordingly, a high density record can be made with high accuracy by applying such a detecting system to the land-groove recording system.

In particular, a shortest pattern of a used modulating code is generally formed as a preformat in a VFO area 20 within the ID section 9. This VFO area 20 corresponds to one VFO1 and two VFO2s in FIG. 4. Therefore, an intensity level of the regenerating signal in this VFO area 20 is lowest so that this pattern tends to be most greatly influenced by crosstalk.

Therefore, in this embodiment, the pattern formed as a preformat in the VFO area 20 within the ID section 9 of the above optical information recording medium is arranged by shifting phases from each other by 180° or so between the land portion 2 and the groove portion 3 adjacent to each other and forming this pattern.

FIG. 8b shows a pattern formed as a preformat in the VFO area 20 of the ID section 9 at a time of RLL(1,7) modulation. Phases are shifted from each other by 180° between the land portion 2 and the groove portion 3 adjacent to each other. Therefore, it is possible to reduce a bad influence caused by crosstalk between the land portion 2 and the groove portion 5 so that a regenerating signal within the VFO area 20 can be accurately detected. Accordingly, a high density record can be made with high accuracy by applying such a detecting system to the land-groove recording system.

In an optical information recording medium having a first construction of the present invention, information of a data format constructed by an ID section and a data section can be recorded and regenerated from both regions for a land portion and a groove portion formed on a disk face. Information such as an address is recorded to the ID section as a format by a PPM recording system when information is recorded to the data section by a PWM recording system.

In the first construction, it is possible to restrain crosstalk in the ID section as a maximum defect in each of the land-groove recording system and the PWM recording system. Accordingly, the land-groove recording system and the PWM recording system can be commonly used so that a high density record can be made with high accuracy.

In an optical information recording medium having a second construction of the present invention, information of a data format constructed by an ID section and a data section in one sector can be recorded and regenerated from both regions for a land portion and a groove portion formed on a disk face. The ID section has no sector mark formed by a unique pattern irrespective of a modulating code rule used to detect a leading position of each of sectors.

In the second construction, a bad influence from the sector mark causing largest crosstalk can be removed by deleting the sector mark arranged for only detection of the leading position of each of the sectors. As a result, a high density record can be made in the land-groove recording system with high accuracy.

In an optical disk drive unit having a third construction of the present invention, recording and regenerating operations, etc. of a data format constructed by an ID section and a data section can be performed in both regions for a land portion and a groove portion of an optical information recording medium. The ID section has no sector mark formed by a unique pattern irrespective of a modulating code rule used to detect a leading position of each of sectors. The optical disk drive unit comprises a sector leading position detecting means for detecting a leading position of each of the sectors by calculating a DC level difference between regenerating signals obtained from the ID section and the data section having a special pattern in this optical information recording medium.

In the third construction, the DC level difference between the regenerating signals of the ID section and the data section is detected instead of the sector mark so that the leading position of each of the sectors can be detected by a very simple construction. Accordingly, a bad influence from the sector mark causing largest crosstalk can be removed so that a high density record can be made in the land-groove recording system with high accuracy.

In an optical disk drive unit having a fourth construction of the present invention, recording and regenerating operations, etc. of a data format constructed by an ID section and a data section can be performed in both regions for a land portion and a groove portion of an optical information recording medium. The ID section has no sector mark formed by a unique pattern irrespective of a modulating code rule used to detect a leading position of each of sectors. The optical disk drive unit comprises a sector leading position detecting means for detecting a leading position of each of the sectors by detecting a prepit nonexisting area of continuous plural bytes by a regenerating signal from this optical information recording medium and next detecting a VFO pattern formed as a preformat in the ID section.

In the fourth construction, the prepit nonexisting area and the VFO pattern are detected instead of the sector mark and are compared with each other so that the leading position of each of the sectors can be detected by a very simple construction. As a result, a high density record can be made in the land-groove recording system with high accuracy.

In an optical disk drive unit having a fifth construction of the present invention, recording and regenerating operations, etc. of a data format constructed by an ID section and a data section can be performed in both regions for a land portion and a groove portion of an optical information recording medium. The ID section has no sector mark formed by a unique pattern irrespective of a modulating code rule used to detect a leading position of each of sectors. The optical disk drive unit comprises first and second sector leading position detecting means. The first sector leading position detecting means detects a leading position of each of the sectors by calculating a DC level difference between regenerating signals obtained from the ID section and the data section having a special pattern in this optical information recording medium. The second sector leading position detecting means detects a leading position of each of the sectors by detecting a prepit nonexisting area of continuous plural bytes by the regenerating signals from the optical information recording medium and next detecting a VFO pattern formed as a preformat in the ID section.

In the fifth construction, the leading position of each of the sectors instead of the sector mark can be detected more reliably and accurately by using the two sector leading position detecting means. As a result, a high density record can be made in the land-groove recording system with high accuracy.

In an optical information recording medium having a sixth construction of the present invention, information of a data format constructed by an ID section and a data section in one sector can be recorded and regenerated from both regions for a land portion and a groove portion formed on a disk face. A pattern formed as a preformat in the ID section is arranged by shifting phases from each other in the land portion and the groove portion adjacent to each other and forming this pattern.

In the sixth construction, it is possible to prevent the amplitude of a regenerating signal from being reduced by crosstalk between the adjacent land and groove portions. As a result, a high density record can be made in the land-groove recording system with high accuracy.

In an optical information recording medium having a seventh construction of the present invention, information of a data format constructed by an ID section and a data section in one sector can be recorded and regenerated from both regions for a land portion and a groove portion formed on a disk face. A pattern formed as a preformat in a VFO area within the ID section is arranged by shifting phases from each other by 180° or so in the land portion and the groove portion adjacent to each other and forming this pattern.

In the seventh construction, it is possible to reduce a bad influence caused by crosstalk between the land and groove portions in the VFO area having a lowest intensity level of a regenerating signal in the ID section. As a result, a high density record can be made in the land-groove recording system with high accuracy.

An optical information recording medium having an eighth construction in accordance with one embodiment of the present invention will next be explained with reference to FIGS. 9 and 10. FIG. 9 shows the optical information recording medium having the eighth construction in this embodiment. For example, this optical information recording medium is constructed by an optical disk. The optical information recording medium is called the optical disk in the following description. In this case, a land portion 101 (L) and a groove portion 102 (G) are formed on the optical disk in a spiral or concentric shape. A land mark 104 is formed in a position information section 103 of the land portion 101 and is constructed by a pit recorded as position information. The position information section is called an ID section in the following description. A groove mark 106 is formed in the ID section 103 of the groove portion 102 and is recorded as interrupting position information between grooves 105. Thus, the position information of the groove portion 102 and the position information of the land portion 101 are recorded as independent position information different from each other.

In this optical disk, information can be recorded and regenerated by using a difference in reflectivity between a crystal and a noncrystal as characteristics of a recording film in an unillustrated data section as phase changing media. In contrast to this, the ID section 103 shows rewriting inhibiting information. Accordingly, similar to general MO media such as a magnetooptic disk, the land mark 104 recorded as position information and the groove mark 106 as an interrupting portion between the grooves 105 are manufactured by existence and nonexistence of a pit and a groove when a stamper is manufactured.

FIG. 10(a) shows a preformat of a groove portion in a general optical disk for only record and regeneration with respect to the groove portion. FIG. 10(b) shows a preformat of a land portion in a general optical disk for only record and regeneration with respect to the land portion. In this case, in the preformat of the groove portion, information is recorded by making existence or nonexistence of a groove 107 correspond to existence or nonexistence of a mark when the stamper is manufactured. In the preformat of the land portion, information is recorded by making a land mark 108 as a pit in the land portion correspond to existence of a mark when the stamper is manufactured.

Accordingly, independent position information unable to be rewritten can be obtained on the same recording medium in a high density state in each of the ID sections 103 of the land portion 101 and the groove portion 102. Further, the position information of the high density recording medium is accurately held and the recording medium is reliable. Thus, it is not necessary to move an optical pickup from the recording medium for only record and regeneration in the land portion to the recording medium for only record and regeneration in the groove portion so as to read position information as in the general case. Accordingly, it is possible to increase an access speed to a desirable recording-regenerating position.

Figure 11:
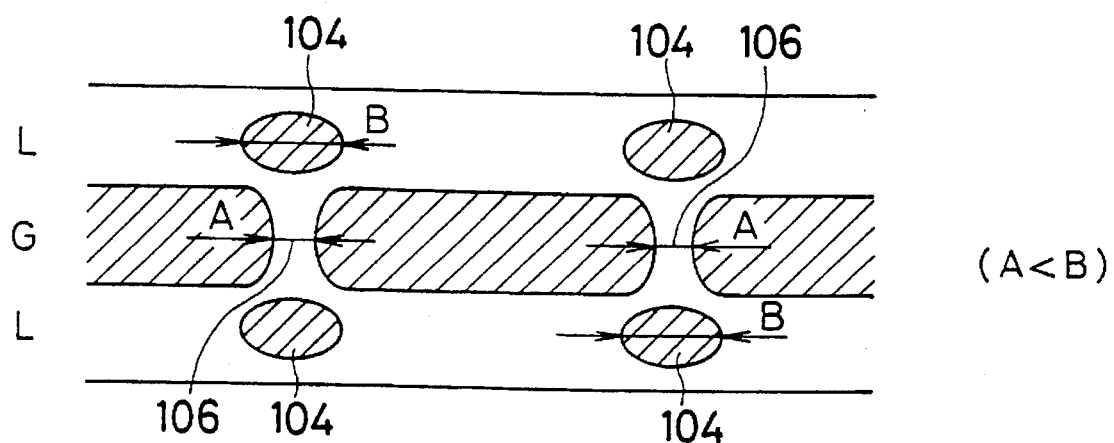
FIG. 11 is a plan view of a position information section in an optical information recording medium having a ninth construction in accordance with one embodiment of the present invention.
Figure 12:
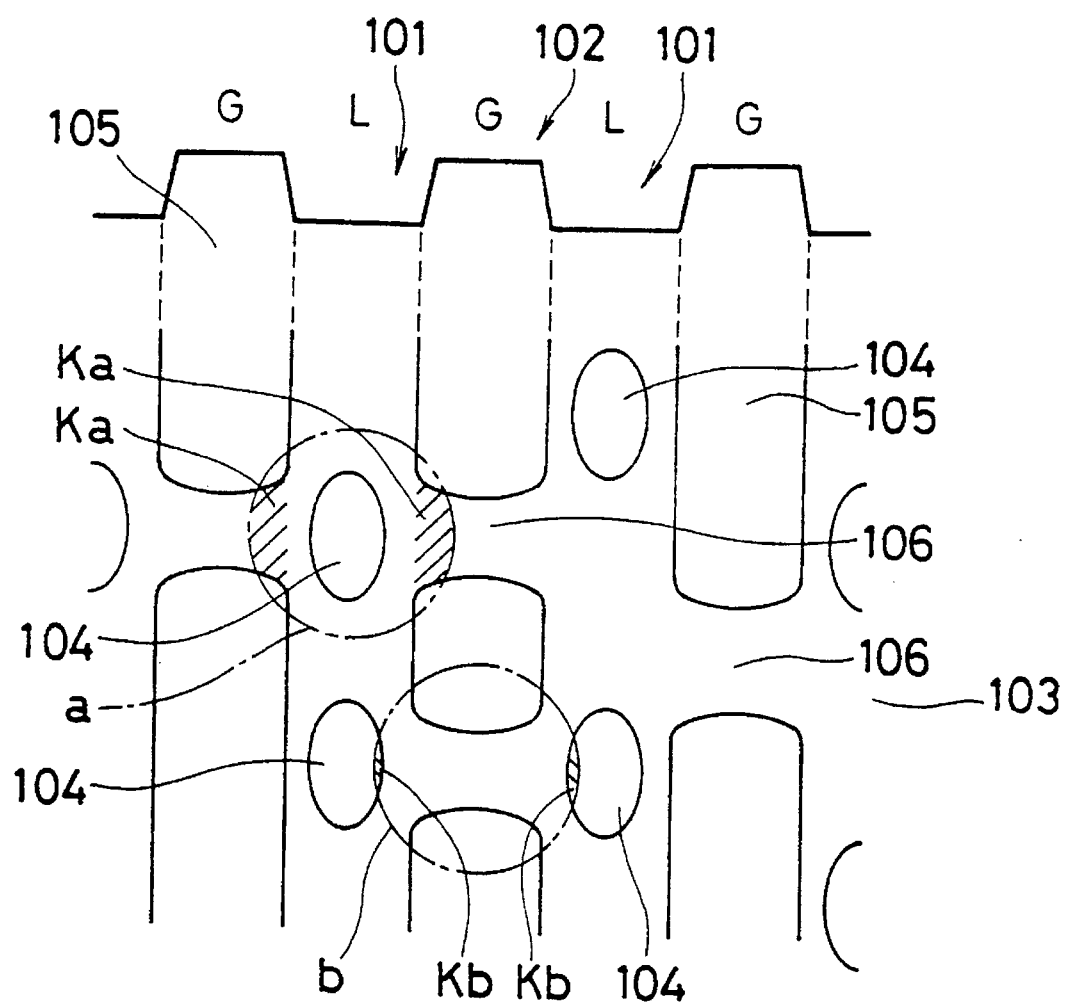
FIG. 12 is a plan view showing influences of crosstalk in tracking of the optical information recording medium on the position information section.

An optical information recording medium having a ninth construction in accordance with one embodiment of the present invention will next be explained with reference to FIGS. 11 and 12. In FIGS. 11 and 12, the same constructional portions as FIGS. 9 and 10 showing the eighth construction are designated by the same reference numerals and an explanation about these constructional portions is omitted in the following description.

FIG. 12 shows a tracking state on a surface of an optical disk having the ID section 103 formed as a preformat in each of the land portion 101 and the groove portion 102 in the above eighth construction. In this optical disk having the ID section 103, influences of crosstalk become a large factor for determining a track pitch. At tracking times of a light spot a on the land portion 101 and a light spot b on the groove portion 102, crosstalk Ka from a groove mark 106 (constructed by an interrupting portion between grooves 105) at the land tracking time is larger in influence than crosstalk Kb from a land mark 104 at the groove tracking time. Such a phenomenon is caused for the following reasons. The land mark 104 is constructed by a pit narrower than a width of the land portion 101. The groove mark 106 is formed by an interrupting portion between the grooves 105. Accordingly, when the light spots a and b pass through a center of the land portion 101 or the groove portion 102, a reflected light amount is greatly influenced by existence and nonexistence of the groove mark 106.

Therefore, in this embodiment, a tracking directional length of the land mark 104 formed in the ID section 103 of the land portion 101 is set to be different from a tracking directional length of the groove mark 106 formed in the ID section 103 of the groove portion 102. Concretely, in FIG. 11, the length of the groove mark in the tracking direction is set to A and the length of the land mark in the tracking direction is set to B. These mark lengths A and B are set in a condition B>A when recording and regenerating conditions such as a rotating speed of the disk, a recording frequency, etc. are equal to each other in a land-groove recording system and a PPM (pit position record) system is used. Such a condition is set because a frequency band in crosstalk from the ID section 103 of an adjacent groove portion 102 is approximately equal to a frequency band of a detecting signal from the ID section 103 of the tracking land portion 101 so that it is difficult to remove this crosstalk from the detecting signal. When B>A is set, it is possible to reduce a crosstalk amount from the groove portion 102 during tracking of the land portion 103.

When the recording and regenerating conditions are changed in the land portion 101 and the groove portion 102 and a PWM (pit edge record) system is used, no tracking position is dislocated by selecting the condition B>A even when the mark length B is longer than the mark length A. Further, crosstalk can be restrained by setting the condition B>A by a method for removing a different frequency component of a filter, etc.

The length A of the groove mark is increased even when A>B must be set by recording characteristics of a recording film, etc. Therefore, it is necessary to arrange a means for preventing a track from being dislocated from a groove. However, in this case, similar to the case of B>A, crosstalk can be also restrained by a filter, etc.

Accordingly, when the recording-regenerating conditions in the land-groove recording system are equal to each other, influences of crosstalk from the groove mark 108 of the groove portion 102 can be reduced in tracking of the land portion 101 by changing the land mark length A in the land portion 101 and the groove mark length B in the groove portion 102. In contrast to this, when the recording-regenerating conditions are different from each other, the crosstalk can be removed by using a filter. Thus, information of the ID section 103 independent of both the land portion 101 and the groove portion 102 can be accurately regenerated.

An optical information recording medium having a tenth construction in accordance with one embodiment of the present invention will next be explained with reference to FIG. 13. In FIG. 13, the same constructional portions as FIGS. 9 to 12 showing the eighth and ninth constructions are designated by the same reference numerals and an explanation about these constructional portions is omitted in the following description.

Figure 13A:
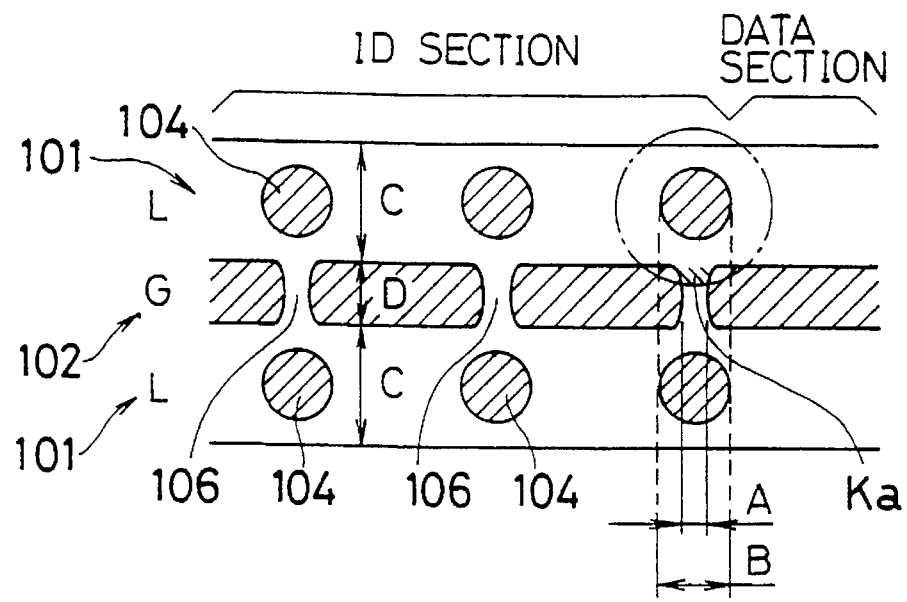
FIG. 13($a$) is a plan view of a position information section in an optical information recording medium having a tenth construction in accordance with one embodiment of the present invention.
Figure 13B:
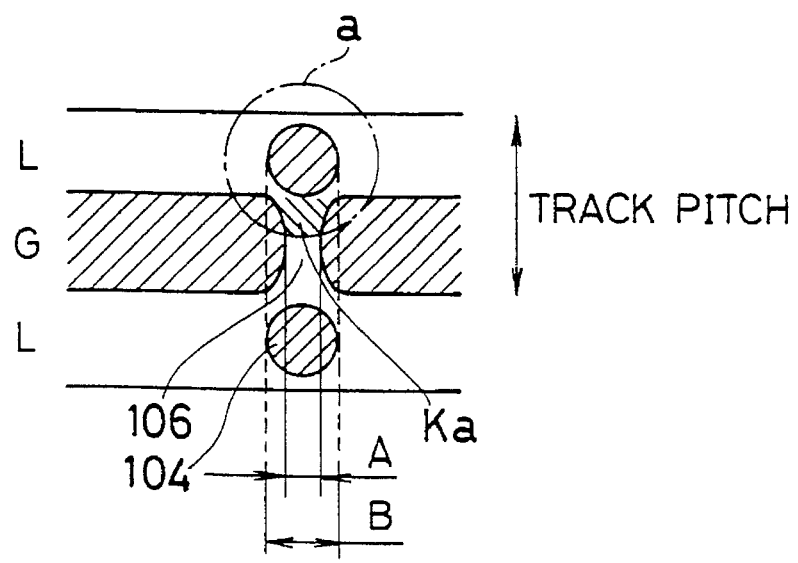

In the above embodiment showing the ninth construction, the lengths of the land mark 104 and the groove mark 108 in the tracking direction are changed to reduce crosstalk during the tracking operation. In contrast to this, in this embodiment showing the tenth construction, at least a land width C in an ID section 103 of a land portion 101 is set to be wider than a groove width D in an ID section 103 of a groove portion 102 so as to reduce crosstalk during the tracking operation. FIG. 13(a) shows a state of C>D in this embodiment. FIG. 13(b) shows a normal state of C=D. When the tracking operation of a light spot a is performed in the land portion 101 in such states, track pitches and spot diameters in both the cases (a) and (b) are respectively equal to each other, but an amount of crosstalk Ka in the case (a) is smaller than that in the case (b). Accordingly, the crosstalk amount caused by the groove mark 108 at the tracking time of the land portion 101 can be reduced by setting the land width C to be wider than the groove width D. Thus, information of the ID section 105 independent of both the land portion 101 and the groove portion 102 can be accurately regenerated.

An optical information recording medium having an eleventh construction in accordance with one embodiment of the present invention will next be explained with reference to FIG. 14. In FIG. 14, the same constructional portions as FIGS. 9 to 13 showing the eighth to tenth constructions are designated by the same reference numerals and an explanation about these constructional portions is omitted in the following description.

Figure 9A:
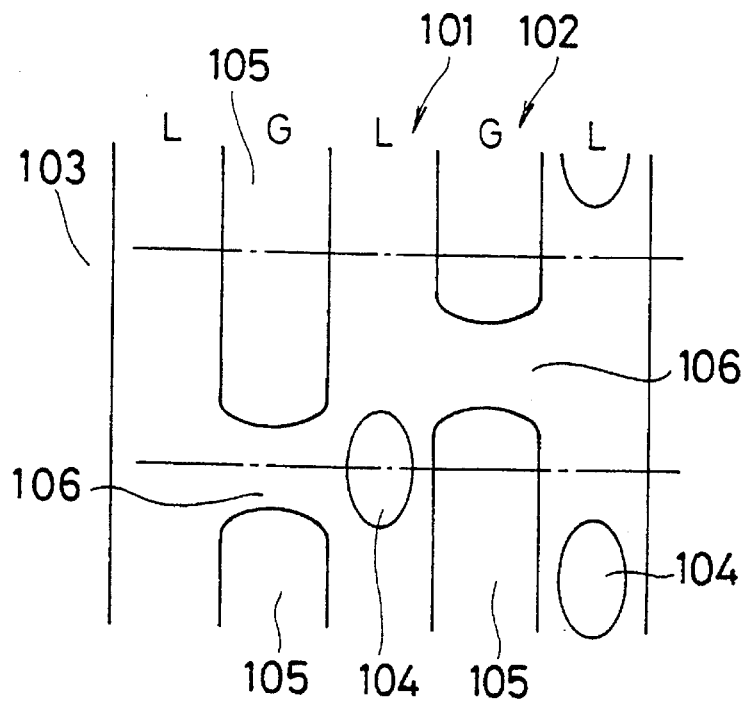
FIG. 9($a,b$) is a view showing the shape of an optical information recording medium having an eighth construction in accordance with one embodiment of the present invention in which FIG. 9($a$) is a plan view of a position information section and FIG. 9($b$) is a cross-sectional view of the position information section.
Figure 9B:
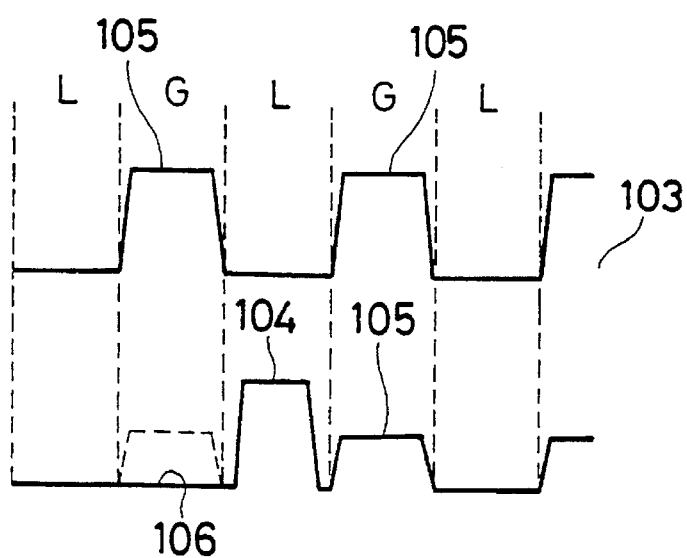
Figure 14A:
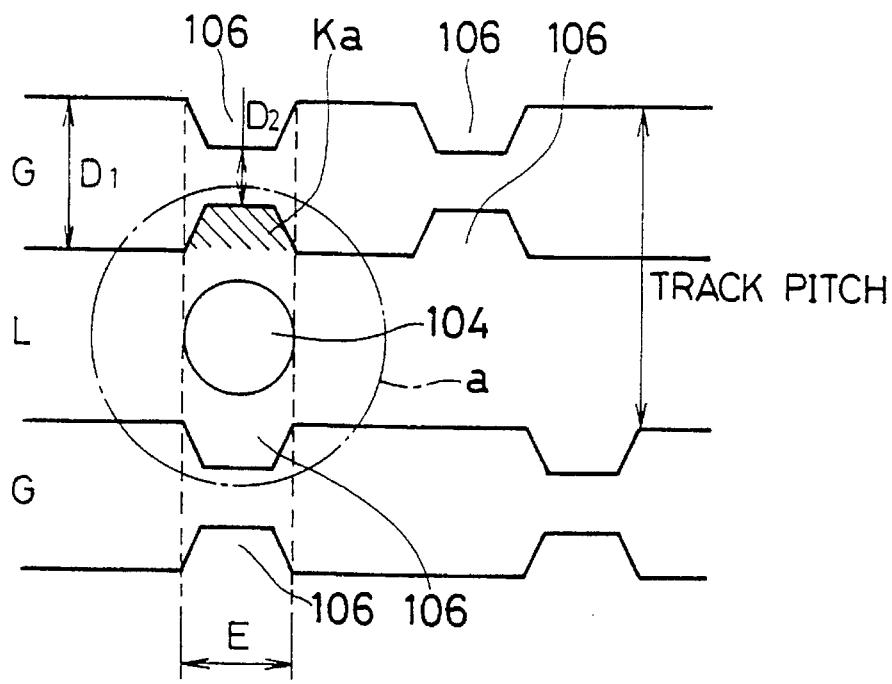
FIG. 14($a$) is a plan view showing influences of crosstalk in a position information section in an optical information recording medium having an eleventh construction in accordance with one embodiment of the present invention.

Similar to the above eighth construction shown in FIG. 9(a), a land mark 104 composed of a pit recorded as position information is formed in an ID section 103 of a land portion 101 in an optical disk shown in FIG. 14(a). In this embodiment, a groove mark 108 is further formed by a change in groove width in an ID section 103 of a groove portion 102. The groove mark 108 is recorded as independent position information different from the position information of the land portion 101. A groove width $D_2$ in the groove mark 108 is extremely narrower than a width $D_1$ of a groove 105. The groove 105 is formed without interruption in a track while the width of this groove 105 is periodically changed.

Figure 14B:
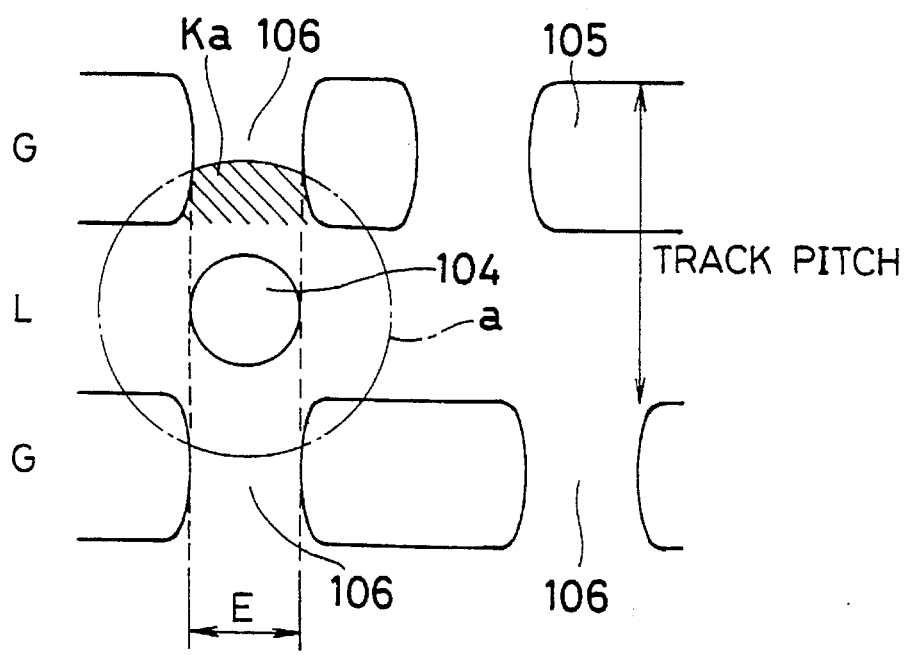

FIG. 14(b) shows a mark shape corresponding to the above eighth construction. A groove mark 10B in FIG. 14(b) corresponds to an interrupting region between grooves 105. When the tracking operation of a light spot a is performed in a land portion 101 in such a state, track pitches and spot diameters in both the cases (a) and (b) are respectively equal to each other, but an amount of crosstalk Ka in the case (a) is smaller than that in the case (b). Accordingly, the crosstalk amount caused by the groove mark 106 at the tracking time of the land portion 101 can be reduced since mark detection in the ID section 103 of the groove portion 102 corresponds to a change in shape of each of the grooves having the widths $D_1$ and $D_2$. Thus, information of the ID section 103 independent of both the land portion 101 and the groove portion 102 can be accurately regenerated.

Figure 15A:
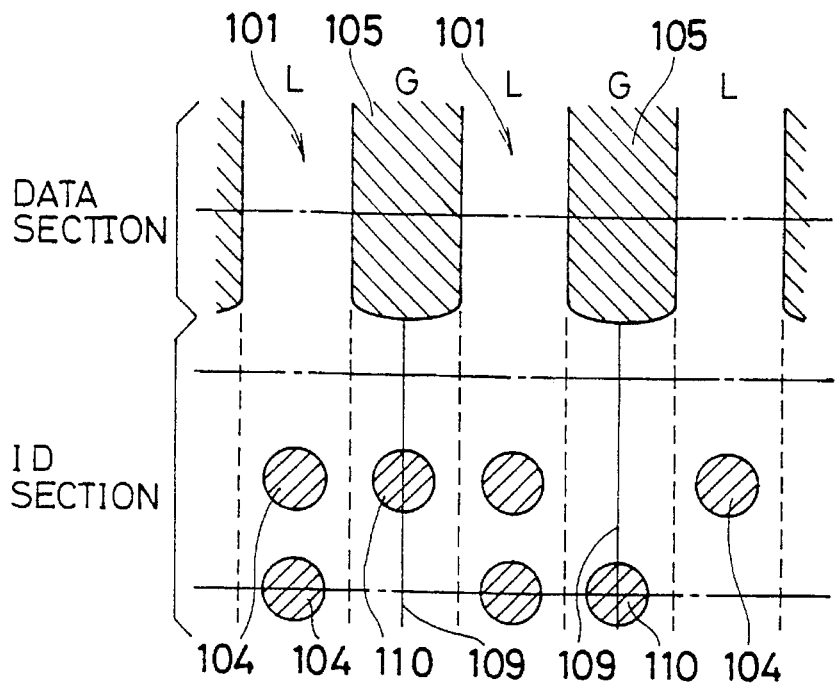
FIG. 15($a,b$) shows an optical information recording medium having a twelfth construction in accordance with one embodiment of the present invention in which FIG. 15($a$) is a plan view of this optical information recording medium
FIG. 15(b) is a cross-sectional view of this optical information recording medium.
Figure 15B:
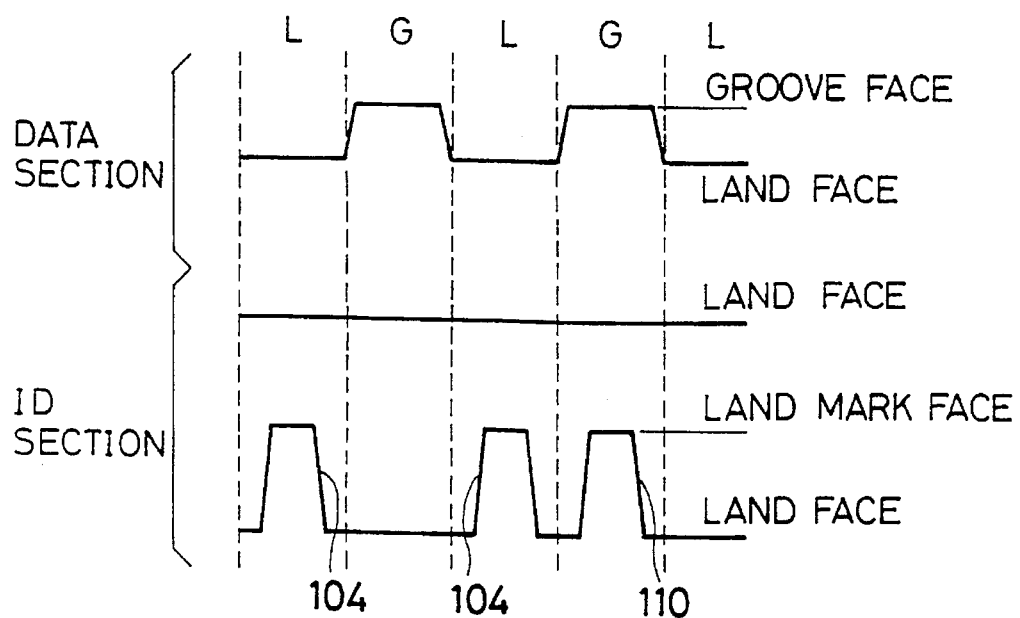

An optical information recording medium having a twelfth construction in accordance with one embodiment of the present invention will next be explained with reference to FIG. 15. In FIG. 15, the same constructional portions as FIGS. 9 to 14 showing the eighth to eleventh constructions are designated by the same reference numerals and an explanation about these constructional portions is omitted in the following description.

In an optical disk shown in FIG. 15, a land mark 104 is formed in an ID section 103 of a land portion 101 and is composed of a pit recorded as position information similar to that in each of the above eighth and eleventh constructions. No groove 105 is formed in an ID section 103 of a groove portion 108. A groove mark 110 instead of this groove 105 is formed on a central line 109 of a virtual groove. This groove mark 110 is composed of a pit recorded as independent position information different from the position information of the land portion 101. In such a construction, when a tracking operation is performed within the ID section 103 of the land portion 101, crosstalk is completely removed since there is no groove 105 in the ID section of the land portion although a groove 105 exists in a data section. Accordingly, mark detection in the ID section 103 of the groove portion 102 corresponds to the groove mark 110 composed of a pit instead of an interrupting portion between grooves 105 as mentioned above. Therefore, a crosstalk amount can be reduced irrespective of land tracking or groove tracking.

An optical information recording-regenerating apparatus having a thirteenth construction in accordance with one embodiment of the present invention will next be explained with reference to FIG. 18. In FIG. 18, the same constructional portions as FIGS. 9 to 15 showing the eighth to twelfth constructions are designated by the same reference numerals and an explanation about these constructional portions is omitted in the following description.

An optical information recording medium having the above twelfth construction is used in this embodiment. In this optical information recording medium, no groove 105 is formed in only an ID section 103 of a groove portion 102. A groove mark 110 is formed in this ID section 103 and is composed of a pit recorded as independent position information different from position information of a land portion 101. This thirteenth construction is characterized in a tracking system of the optical information recording-regenerating apparatus in which information is recorded and regenerated from this optical information recording medium.

FIG. 16 shows a control system of the optical information recording-regenerating apparatus. In FIG. 18, an optical pickup portion 112 is arranged in proximity to an optical disk 111. An output signal from this optical pickup portion 112 is transmitted to a matrix circuit 113. This matrix circuit 113 is connected to a tracking correcting circuit 114 as a tracking correcting means. An output signal of this tracking correcting circuit 14 is transmitted to the optical pickup portion 112. The tracking correcting circuit 114 has a tracking error signal generating circuit 115, a servo circuit 116 and an ID section detecting circuit 117. The tracking error signal generating circuit 115 generates a tracking error signal Tr. This tracking error signal Tr is transmitted to the servo circuit 116. The ID section detecting circuit 117 functions as a position information section tracking control means constituting a main portion of the thirteenth construction in this embodiment. In this case, in tracking of the ID section 103 in the groove portion 102, the ID section detecting circuit 117 holds an operation of the tracking correcting circuit 114 just before the ID section 103 having no groove 105. The operation of the tracking correcting circuit 114 is returned to a normal operation by the ID section detecting circuit 117 after the ID section 103 is completely tracked.

In a normal operation of such an optical information recording-regenerating apparatus, light is reflected on the optical disk 111 and is detected as a signal by the optical pickup portion 112. Thereafter, a calculation is made with respect to this detected signal in the matrix circuit 113. An output signal of this matrix circuit 113 is transmitted to the tracking error signal generating circuit 115 so that a tracking error signal Tr is generated. This tracking error signal Tr is transmitted to the servo circuit 116. The servo circuit 116 performs tracking control with respect to the optical pickup portion 112 with a track of the optical disk 111 as a center.

When the optical pickup portion 112 approaches the ID section 103 having no groove 105 during the tracking operation of the optical disk 111, a hold signal h is outputted from the ID section detecting circuit 117 to the servo circuit 118. Thus, the servo circuit 116 continues a control state of the optical pickup portion 112 before the optical pickup portion moves into a region for the ID section 103 without any influence of the newly inputted tracking error signal Tr. Thereafter, when a data section is again tracked through the ID section 103, the hold signal h is released. Thus, the servo circuit 118 restarts control of the optical pickup portion 112 based on an updated tracking error signal Tr inputted to this servo circuit.

As mentioned above, the ID section detecting circuit 117 is arranged and the operation of the tracking correcting circuit 114 is held just before the optical pickup portion moves into the ID section 103 having no groove 105. Therefore, no follow-up operation of the tracking correcting circuit 114 is also performed with respect to a scanning disturbance caused by nonexistence of the tracking error signal Tr in movement of the optical pickup portion into this ID portion 103. Thus, the tracking correcting circuit 114 can be stably operated at any time. Further, the operation of the optical information recording-regenerating apparatus can be rapidly returned to the tracking operation after the ID section 103 is completely detected.

An optical information recording medium having a fourteenth construction in accordance with one embodiment of the present invention will next be explained with reference to FIGS. 17 to 23. In FIGS. 17 to 23, the same constructional portions as FIGS. 9 to 16 showing the eighth to thirteenth constructions are designated by the same reference numerals and an explanation about these constructional portions is omitted in the following description.

Figure 17A:
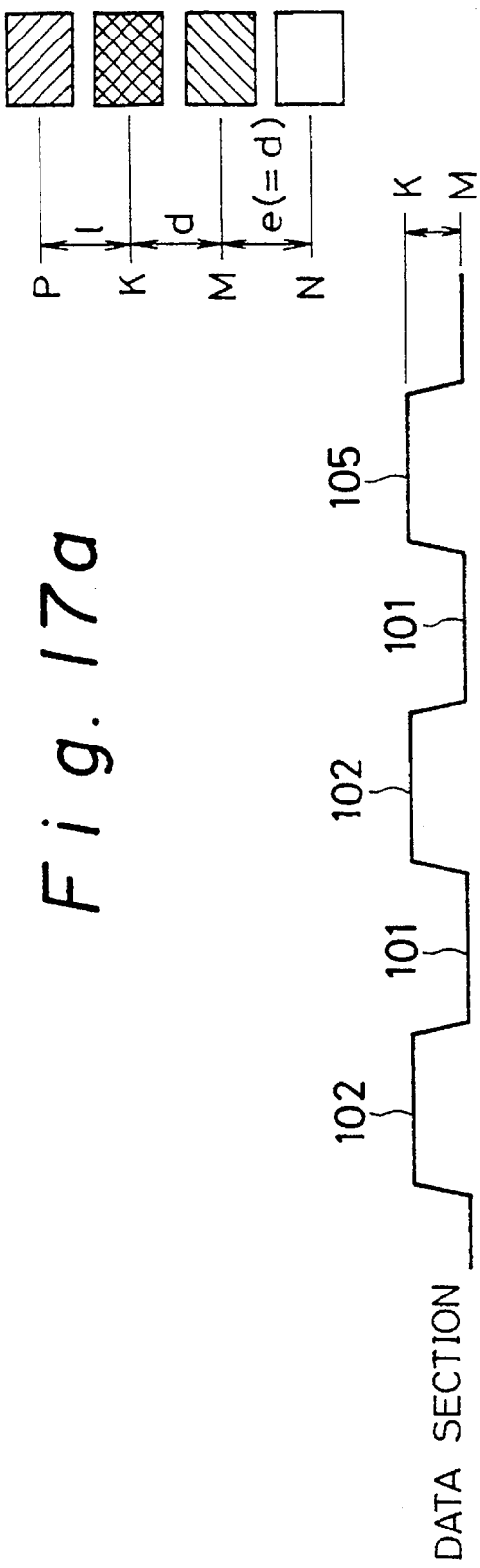
FIG. 17(a) is a cross-sectional view of the optical information recording medium in a data section and FIG. 17(b) is a cross-sectional view of the optical information recording medium in a position information section.
Figure 17B:
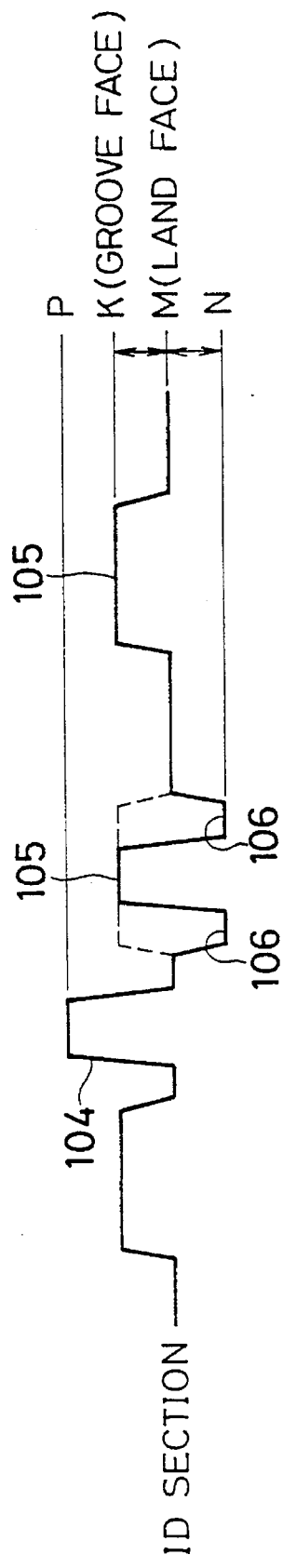

FIG. 17 shows a sectional shape of an optical disk. When a land face of a land portion 101 within an ID section 103 is set to a reference and a groove face of a groove portion 102 has a depth +d, a groove mark 108 having a depth g and recorded as position information is formed on a plane having a depth −e. FIG. 18(*a*) shows a planar shape corresponding to the optical disk shown in FIG. 17. In this embodiment, the depth g is set such that g=d +e is formed. FIG. 18(*b*) shows an output state corresponding to a tracking position shown in FIG. 18(*a*). The present invention is not limited to such a condition g=d e. For example, another condition such as g>d +e may be set. The condition g=d +e with respect to the depth g of the groove mark 106 is set for the following reasons.

Figure 20:
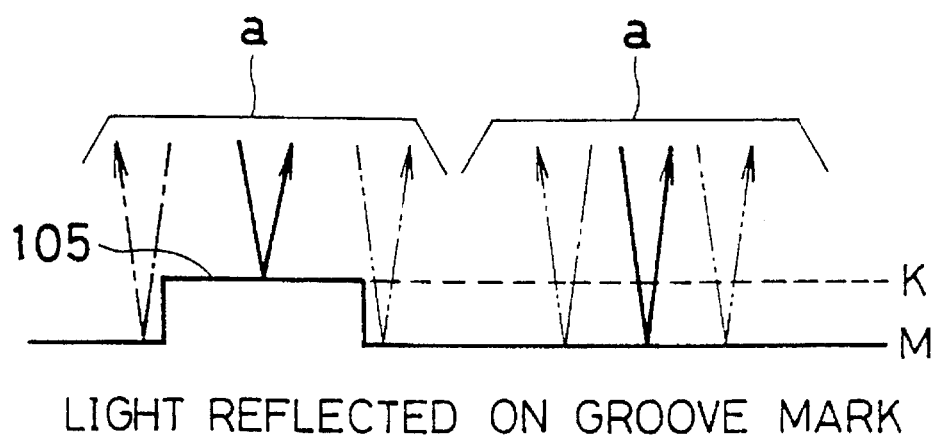
FIG. 20 is a typical view showing states of a reflected light amount in a general groove portion.
Figure 21:
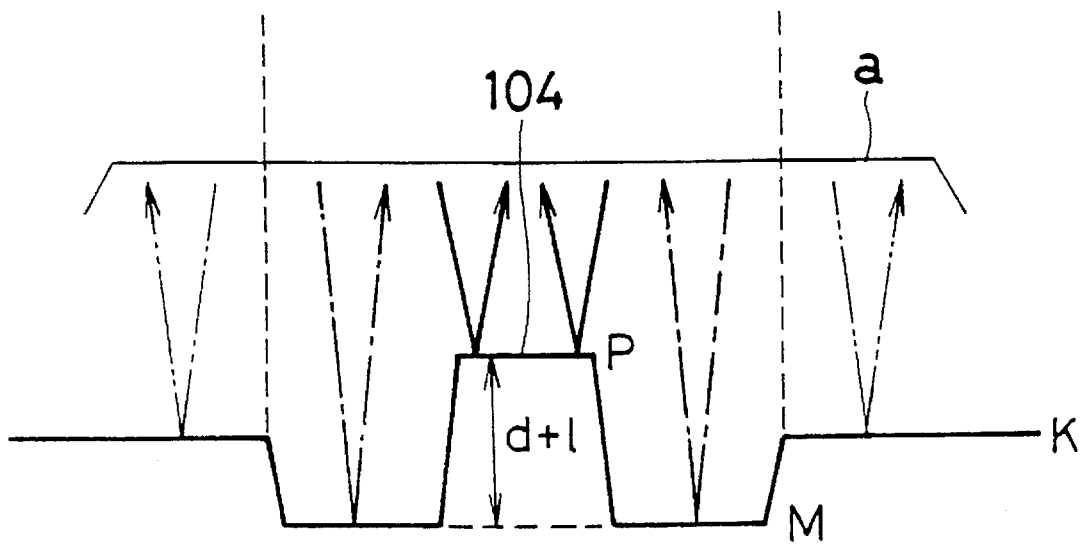
FIG. 21 is a typical view showing states of a reflected light amount in a land portion.

In the following description, a land face and a land mark face are respectively set to M and P. A groove face having no mark in the ID section is set to K. In a normal case, a depth d between M and K shown in FIG. 20 is approximately set to λ/8n providing a maximum intensity of a tracking error signal at a groove depth shown in FIG. 19. In this case, there is no clear contrast between the case of existence of the groove 105 and the case of nonexistence of the groove 105 in the groove mark 108 since a reflected light amount is large in the case of existence of the groove 105 and is maximum in the case of nonexistence of the groove 105. λ and n respectively designate a wavelength of a laser and a refractive index of a substrate. In contrast to this, in a normal case, a depth d +l(alphabet) as a pit depth in the land portion between M and P shown in FIG. 21 is approximately set to λ/4n which provides a lowest intensity of the reflected light amount at a groove depth shown in FIG. 19 and provides a clear contrast between existence and nonexistence of the mark. Accordingly, for such reasons, the depth g of the groove mark 108 providing a large contrast in FIG. 21 is desirable in comparison with the depth shown in FIG. 20.

In this embodiment, the groove mark 106 in the ID section 103 is formed on a plane N deeper than the land face M by a depth e. In this case, the depth of the groove mark is preferably set to a depth 2*d* between N and K (see FIG. 22), but the present invention is not limited to this depth. Accordingly, the groove mark 10B is formed at a depth approximately equal to λ/4n deeper than the general depth λ/8n so that contrast between existence and nonexistence of the groove mark can be set to be clear. Thus, detecting sensitivity of the groove mark is improved so that an error in detection of the groove mark can be reduced.

Figure 23A:
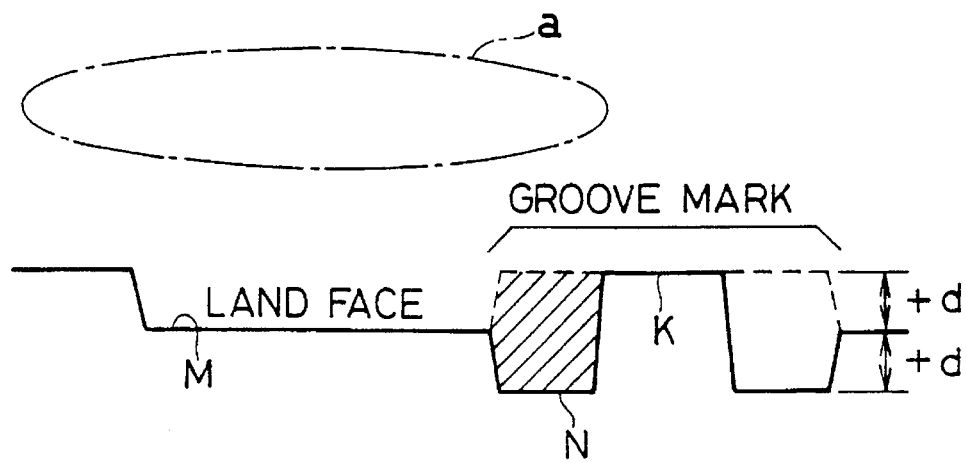
FIG. 23(a) is a typical view showing influences of crosstalk from the groove portion in tracking of the land portion.
Figure 23B:
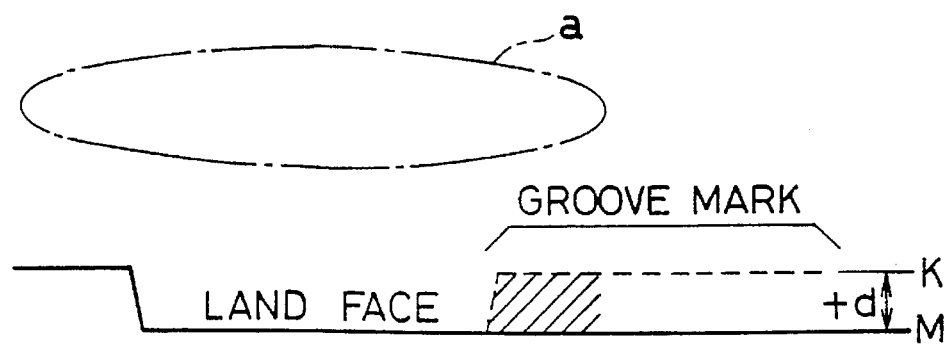
FIG. 23(b) is a typical view showing influences of crosstalk caused by the construction of a general groove mark.

FIG. 23 shows comparison of influences of crosstalk in tracking of the land portion 101 in the groove mark 106 in this embodiment and the groove mark having a general structure. In tracking of the land portion 101, there are depth differences +d and −e depending on existence and nonexistence of the groove mark 106 with the land face as a reference in the range of a light spot a leaked to the groove portion 102. However, absolute values of phase differences in the existence and nonexistence of the groove mark, i.e., interference amounts are approximately equal to each other so that no reflected light amount is changed so much. Therefore, it seems that there is no groove mark. Accordingly, the reflected light amount from the groove portion 102 can be reduced in the tracking of the land portion 101 so that an amount of crosstalk Ka can be restrained in comparison with the general case.

An optical information recording medium having a fifteenth construction in accordance with one embodiment of the present invention will next be explained with reference to FIG. 24. In FIG. 24, the same constructional portions as FIGS. 9 to 23 showing the eighth to fourteenth constructions are designated by the same reference numerals and an explanation about these constructional portions is omitted in the following description.

Figure 22:
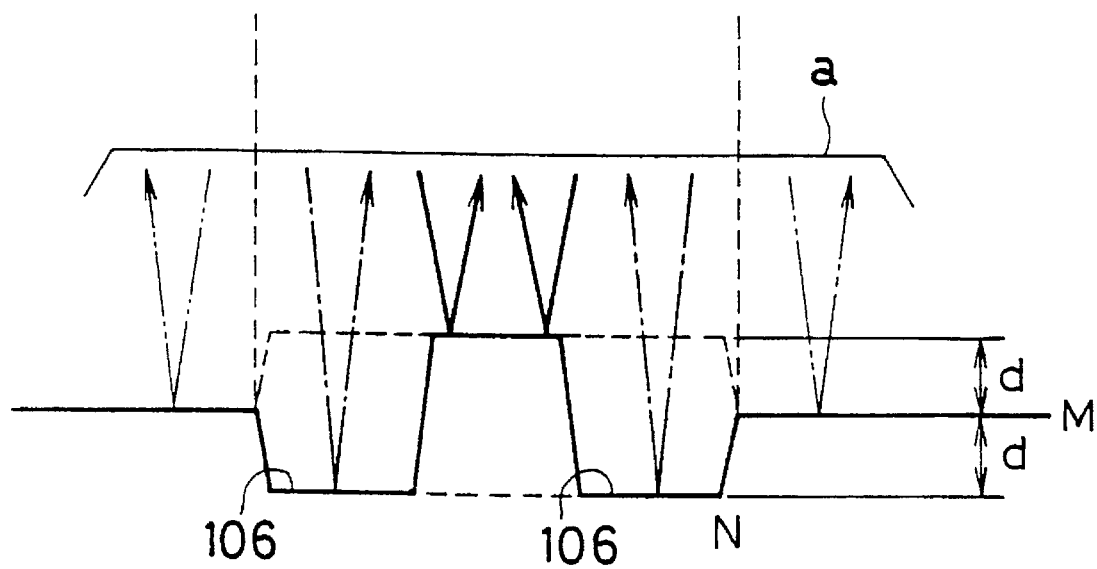
FIG. 22 is a typical view showing states of a reflected light amount in a groove portion.
Figure 24A:
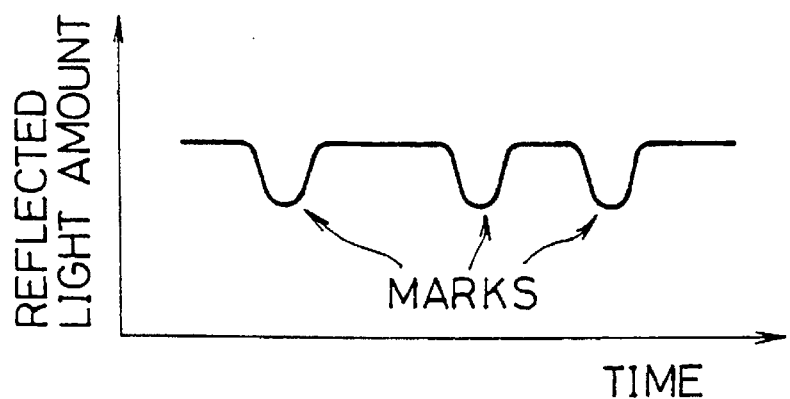
FIG. 24a is a typical view showing changes in reflected light amount with the passage of time in a land mark and a groove mark in an optical information recording medium having a fifteenth construction and an optical information recording-regenerating apparatus having a sixteenth construction in accordance with one embodiment of the present invention.
Figure 24B:
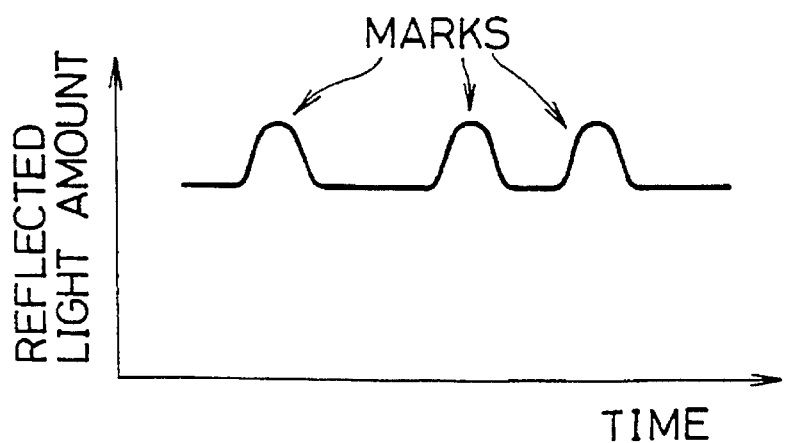
FIG. 24b is a typical view showing a change in reflected light amount with the passage of time in a general groove mark.

In the above fourteenth construction of the present invention, the land mark 104 and the groove mark 106 in the ID section 103 approximately have the same shape as shown in FIGS. 21 and 22. In the fifteenth construction in this embodiment, widths, depths, etc. of the groove mark 106 and a plane N thereof are set such that a reflected light amount of the groove mark 106 is equal to that of the land mark 104. In a concrete example, the width of the plane N of the groove mark 106 is set to be equal to a width of the land mark 104. The depth of this plane N is set to be equal to −d with face M as a reference. The width of the groove mark 106 is set to be equal to the width of the land mark 104. The depth of the groove mark 106 with face N as a reference is set to be equal to a depth on face K on which there is no groove mark. Further, d=λ/8n is set. FIG. 24*a* shows reflected light amounts of the land mark 104 and the groove mark 106 in this embodiment. FIG. 24*a* also shows the reflected light amount of a general land mark 104. In contrast to this, FIG. 24*b* shows the reflected light amount of a general groove mark 106.

The reflected light amounts of the land mark 104 and the groove mark 106 are equal to each other as mentioned above and contrast caused by existence and nonexistence of the marks in accordance with the reflected light amounts is set to be large so that exact position information can be regenerated without changing regenerating systems in the land portion 101 and the groove portion 102.

An optical information recording-regenerating apparatus having a sixteenth construction in accordance with one embodiment of the present invention will next be explained with reference to FIGS. 24 and 25. In FIG. 25, the same constructional portions as FIGS. 9 to 24 showing the eighth to fifteenth constructions are designated by the same reference numerals and an explanation about these constructional portions is omitted in the following description.

In the sixteenth construction in this embodiment, the optical information recording-regenerating apparatus records and regenerates information by using an optical disk as a first optical information recording medium or an optical disk as a second optical information recording medium. In the optical disk as the first optical information recording medium, a depth of the groove mark 106 in the above fourteenth construction is changed. In the optical disk as the second optical information recording medium, reflected light amounts of the land mark 104 and the groove mark 106 in the above fifteenth construction are set to be equal to each other. This optical information recording-regenerating apparatus is characterized in an unillustrated mark detecting means in which the land mark 104 and the groove mark 106 recorded within the ID section 103 of the above optical disk are equally detected in the land portion 101 and the groove portion 102.

Figure 25A:
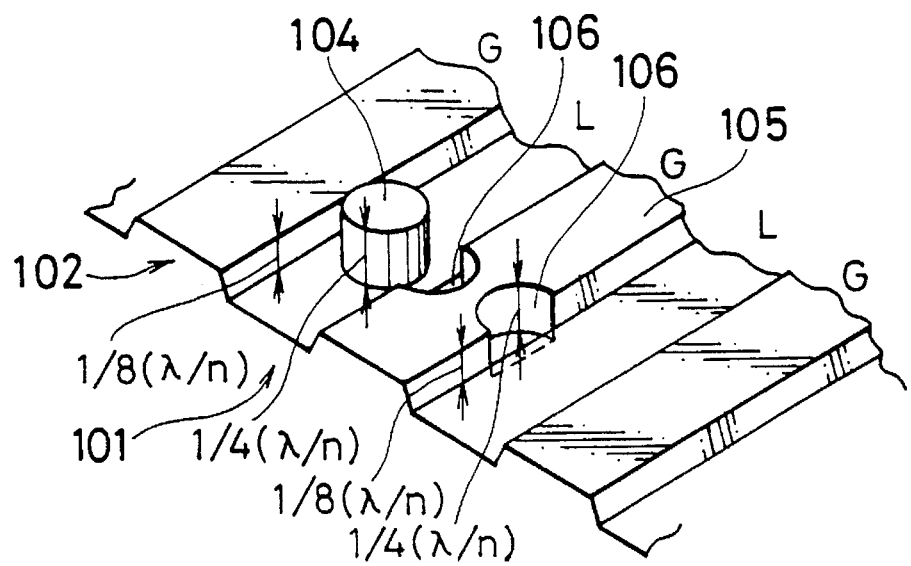
FIG. 25a is a perspective view showing the shape of a position information section in an optical information recording medium in the sixteenth construction in accordance with one embodiment of the present invention.
Figure 25B:
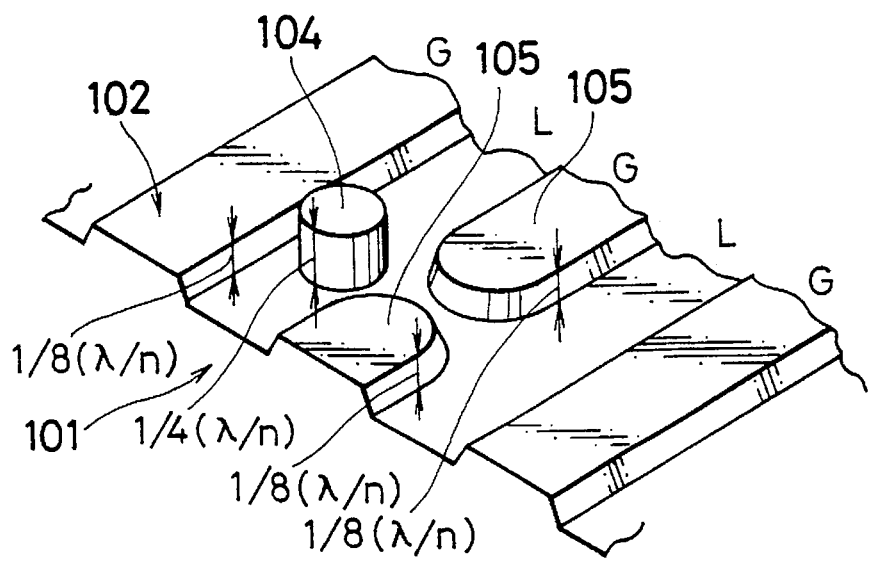
FIG. 25b is a perspective view showing the shape of a position information section in a general optical information recording medium.

FIG. 25*a* shows a surface shape of the optical disk used in this embodiment. FIG. 25*b* shows a surface shape of a general optical disk. In this case, a reflected light amount of the land portion 101 in the general optical disk shown in FIG. 25*b* is provided as shown in FIG. 24*a*. A reflected light amount of the groove portion 102 in this general optical disk is provided as shown in FIG. 24*b*. With respect to the general optical disk, it is necessary to change polarities of a regenerating circuit to detect the reflected light amounts in the land portion 101 and the groove portion 102. Therefore, in this embodiment, regenerating circuits as mark detecting means in the land portion 101 and the groove portion 102 are set to be equal to each other by using that each of the reflected light amounts in the land portion 101 and the groove portion 102 in the optical disk shown in FIG. 25*a* is equal to the reflected light amount in FIG. 24a. Thus, it is not necessary to change polarities of the regenerating circuit as in the general case. A circuit construction can be simplified by using the same regenerating circuit and cost of the optical information recording-regenerating apparatus can be reduced.

In an eighth construction of the present invention, an optical information recording medium comprises a land portion and a groove portion formed in a spiral or concentric shape; a land mark formed in a position information section of the land portion and constructed by a pit recorded as position information; and a groove mark formed in a position information section of the groove portion and constructed by an interrupting portion between grooves and recorded as independent position information different from the position information of the land portion.

In the eighth construction, independent unrewritable position information can be obtained in a high density state in each of the position information sections of the land portion and the groove portion within the same recording medium. Further, this position information of the recording medium in the high density state is accurately held so that a reliable recording medium can be obtained. Thus, it is not necessary to move an optical pickup from a recording medium for only a land record to a recording medium for only a groove record so as to read the position information as in the general optical information recording medium. Accordingly, it is possible to increase an access speed to a desirable recording-regenerating position.

In a ninth construction of the present invention, a tracking directional length of the land mark formed in the position information section of the land portion is different from that of the groove mark formed in the position information section of the groove portion in the eighth construction of the present invention.

In the ninth construction, influences of existence and nonexistence of the marks in the groove portion providing large crosstalk can be reduced when recording and regenerating conditions are equal to each other in a land-groove recording system. The crosstalk can be removed from the groove portion by using a filter when the recording and regenerating conditions are different from each other. Thus, it is possible to accurately regenerate information of the position information sections independently recorded to both the land portion and the groove portion.

In a tenth construction of the present invention, at least a land width of the position information section of the land portion is set to be wider than a groove width of the position information section of the groove portion in the eighth construction of the present invention.

In the tenth construction, a crosstalk amount caused by the groove mark can be reduced at a tracking time of the land portion. Thus, it is possible to accurately regenerate information of the position information sections independently recorded to both the land portion and the groove portion.

In an eleventh construction of the present invention, an optical information recording medium comprises a land portion and a groove portion formed in a spiral or concentric shape; a land mark formed in a position information section of the land portion and constructed by a pit recorded as position information; and a groove mark formed in a position information section of the groove portion and constructed by a change in groove width and recorded as independent position information different from the position information of the land portion.

In the eleventh construction, existence and nonexistence of a mark detected in the position information section of the groove portion correspond to a change in a groove width. Accordingly, a crosstalk amount caused by the groove mark can be reduced at a tracking time of the land portion. Thus, it is possible to accurately regenerate information of the position information sections independently recorded to both the land portion and the groove portion.

In a twelfth construction of the present invention, an optical information recording medium comprises a land portion and a groove portion formed in a spiral or concentric shape; a land mark formed in a position information section of the land portion and constructed by a pit recorded as position information; and a groove mark formed in a position information section of the groove portion such that a groove is removed from only this position information section of the groove portion; the groove mark being constructed by a pit recorded as independent position information different from the position information of the land portion.

In the twelfth construction, existence and nonexistence of a mark detected in the position information section of the groove portion correspond to existence and nonexistence of a pit instead of an interrupting portion between grooves. Accordingly, a crosstalk amount can be reduced irrespective of land tracking or groove tracking. Further, regenerating systems in the land and groove portions can be set to be equal to each other.

In a thirteenth construction of the present invention, an optical information recording-regenerating apparatus uses an optical information recording medium and records and regenerates information from the optical information recording medium. The optical information recording medium comprises a land portion and a groove portion formed in a spiral or concentric shape; a land mark formed in a position information section of the land portion and constructed by a pit recorded as position information; and a groove mark formed in a position information section of the groove portion such that a groove is removed from only this position information section of the groove portion. The groove mark is constructed by a pit recorded as independent position information different from the position information of the land portion. The optical information recording-regenerating apparatus comprises position information section tracking control means for holding an operation of tracking correcting means just before the position information section having no groove in tracking of this position information section. The position information section tracking control means returns the operation of the tracking correcting means to a normal operation after termination of the tracking of the position information section.

In the thirteenth construction, the operation of the tracking correcting means is held just before an optical pickup is moved into a position information section having no groove. Accordingly, no tracking correcting means follows a scanning disturbance caused by nonexistence of a tracking error signal when the optical pickup is moved into this position information section. Accordingly, the tracking correcting means can be stably operated at any time. Further, an operation of the optical information recording-regenerating apparatus can be rapidly returned to a tracking operation after the position information section is completely detected.

In a fourteenth construction of the present invention, an optical information recording medium comprises a land portion and a groove portion formed in a spiral or concentric shape and able to independently record information; and a groove mark having a depth g and recorded as position information on a plane having a depth −e when a groove face of the groove portion has a depth +d with a land face of the land portion within a position information section as a reference.

In the fourteenth construction, the groove mark in the groove portion has a special shape so that contrast between existence and nonexistence of the groove mark can be set to be clear. Further, it is possible to greatly reduce crosstalk with respect to an adjacent land portion.

In a fifteenth construction of the present invention, the groove mark within the position information section is formed in a shape for providing a reflected light amount equal to that of the land mark formed within this position information section in the fourteenth construction of the present invention.

In the fifteenth construction, the reflected light amounts in the position information sections of the land and groove portions are set to be equal to each other. Accordingly, position information can be accurately regenerated without changing regenerating systems in the position information sections of the land and groove portions.

In a sixteenth construction of the present invention, an optical information recording-regenerating apparatus uses a first or second optical information recording medium. The first optical information recording medium comprises a land portion and a groove portion formed in a spiral or concentric shape and able to independently record information; and a groove mark having a depth g and recorded as position information on a plane having a depth −e when a groove face of the groove portion has a depth +d with a land face of the land portion within a position information section as a reference. The second optical information recording medium is constructed such that the groove mark within the position information section is formed in a shape for providing a reflected light amount equal to that of the land mark formed within this position information section. The optical information recording-regenerating apparatus records and regenerates information from each of the first and second optical information recording media. The optical information recording-regenerating apparatus comprises mark detecting means for detecting a mark recorded within the position information section of each of the first and second optical information recording media. The mark detecting means equally detects this mark in the land portion and the groove portion.

In the sixteenth construction, regenerating circuits in the land and groove portions can be set to be equal to each other. Accordingly, it is not necessary to change polarities of a regenerating circuit in the land and groove portions as in the general case. Therefore, a circuit construction of the optical information recording-regenerating apparatus can be simplified and the optical information recording-regenerating apparatus can be cheaply manufactured.

Many widely different embodiments of the present invention may be constructed without departing from the spirit and scope of the present invention. It should be understood that the present invention is not limited to the specific embodiments described in the specification except as defined in the appended claims.

What is claimed is:

1. An optical information recording medium having a groove and a land region for recording information of a data format constructed by an ID section on which a pattern is formed as a preformat at a manufacturing time of said medium and a data section in one sector on both of said groove region and said land region;

wherein said pattern is arranged by shifting phases from each other in said land portion and said groove portion adjacent each other, wherein said ID section has VFO patterns arranged on center lines of said land portion and said groove portion and phases of said VFO patterns are shifted from each other by a predetermined angle in said land portion and said groove portion adjacent to each other.

2. An optical information recording medium according to claim 1, wherein said predetermined angle is about 180°.

* * * * *

UNITED STATES PATENT AND TRADEMARK OFFICE
CERTIFICATE OF CORRECTION

PATENT NO.  : 5,602,823
DATED       : February 11, 1997
INVENTOR(S) : Ikuo Aoki, et al.

It is certified that error appears in the above-indentified patent and that said Letters Patent is hereby corrected as shown below:

On the title page, item [54] and col. 1, line 2, "ARRANGE"

--ARRANGED--

Signed and Sealed this

Twelfth Day of August, 1997

Attest:

BRUCE LEHMAN

*Attesting Officer*    Commissioner of Patents and Trademarks